United States Patent
Otaki et al.

[11] Patent Number: 5,931,759
[45] Date of Patent: Aug. 3, 1999

[54] FRICTION-ROLLER SPEED CHANGER

[75] Inventors: Ryoichi Otaki; Koichi Sakai; Hisashi Machida, all of Fujisawa, Japan

[73] Assignee: NSK Ltd., Tokyo, Japan

[21] Appl. No.: 09/073,912

[22] Filed: May 7, 1998

[30] Foreign Application Priority Data

May 9, 1997 [JP] Japan ................................ 9-119553
May 26, 1997 [JP] Japan ................................ 9-135046

[51] Int. Cl.⁶ ................................................ E16H 13/08
[52] U.S. Cl. .......................... 475/195; 475/334; 475/183; 476/61; 476/65
[58] Field of Search ..................... 475/183, 195, 475/196, 334, 149, 346, 347; 476/61, 65, 67, 70, 900

[56] References Cited

U.S. PATENT DOCUMENTS

| | | |
|---|---|---|
| 1,093,932 | 4/1914 | Inghram . |
| 3,380,312 | 4/1968 | Barske . |
| 3,776,051 | 12/1973 | Kraus . |
| 3,848,476 | 11/1974 | Kraus . |
| 3,941,004 | 3/1976 | Kraus . |
| 3,945,270 | 3/1976 | Nelson et al. . |
| 4,408,503 | 10/1983 | Kraus . |
| 4,481,842 | 11/1984 | Nelson . |
| 4,491,038 | 1/1985 | Kraus ................................ 475/183 X |
| 4,555,963 | 12/1985 | Nelson . |
| 4,648,288 | 3/1987 | Kato et al. ........................ 475/183 |
| 4,709,589 | 12/1987 | Kraus . |
| 5,037,361 | 8/1991 | Takahashi ......................... 475/183 X |
| 5,385,514 | 1/1995 | Dawe .................................... 475/346 |
| 5,688,201 | 11/1997 | Zhou ..................................... 475/183 |
| 5,851,163 | 12/1998 | Kawase et al. ..................... 475/183 |

FOREIGN PATENT DOCUMENTS

| | | |
|---|---|---|
| 2 542 406 | 9/1984 | France . |
| 1 500 337 | 6/1969 | Germany . |

*Primary Examiner*—Dirk Wright
*Assistant Examiner*—Peter T. Kwon
*Attorney, Agent, or Firm*—Everson, McKeown Edwards & Lenahan, PLLC

[57] ABSTRACT

A friction-roller speed changer has three intermediate rollers (12a, 12b, 12c). Two rollers (12a, 12b) of which act as a wedge roller and can be moved into the narrower area of an annular space (10) by the transmission of power, wherein during power transmission from the input side in the normal state to the output side. The other intermediate roller (12a or 12b), which does not act as the wedge roller, moves into the wider area of the annular space (10) against the elastic force of the spring (14) whereby transmission efficiency for bidirectional rotation is maintained while preventing backflow of power.

4 Claims, 21 Drawing Sheets

FRICTION-ROLLER SPEED CHANGER

FIELD OF THE INVENTION

This invention relates to improvements to a friction-roller-type speed changer that is installed in various kinds of machinery and is used for decelerating or accelerating a rotating force from a drive unit, such as an electric motor, while transmitting it to a driven unit, and in the case that the power for the drive unit is not necessary, it improves the efficiency of the machinery by preventing the drive unit from being a load.

BACKGROUND OF THE INVENTION

A friction-roller-type speed changer generates less noise than a gear-type speed changer, such as one which uses planetary gears, even when operating at high speeds. The use of this kind of friction-roller-type speed changer in a bicycle which uses auxiliary power from an electric motor to reduce the amount of force required for stepping on the pedals has been disclosed in Japanese Patent Publication Tokukai Hei No. 7-95744.

FIG. 1 is a block diagram of an auxiliary-powered drive apparatus for a bicycle etc. To drive the load 1, such as gears or the like of the bicycle, a first input unit 2, which is the input of human power from the pedals, etc., and a second input unit 3, which is from an electric motor, are arranged in parallel. The second input unit 3 has higher speed but lower torque when compared with the first input unit 2, and in the stage that follows it, there is a decelerator 4, which reduces the speed and increases the torque of the power that is input from the second input unit 3. The input unit 3 uses a sensor (not shown in the figure) to detect tile drive force that is applied from the first input unit and to generate a drive force that corresponds to that drive force, so that even if the force applied to the first input unit 2 is small, it is possible to drive the load 1. In other words, a driving torque $T_2$, that corresponds to the driving torque $T_1$ generated by the first input unit 2, is generated by the second input unit 3 and decelerator 4. Moreover, both of these driving torques, $T_1$ and $T_2$, are combined in a combination unit 5, and the total torque $T_3$ (if losses due to friction are ignored, $T_3=T_1+T_2$) drives the load 1.

In the example of an auxiliarily powered bycicle, when forcibly pressing the pedal regardless of whether going down a gradual slope or driving with a strong following wind, the torque $T_1$ applied to the first input unit 2 may be larger than the total torque $T_3$ required for driving the load ($T_1>T_3$). In this case, of the torque $T_1$ that is applied to the first input unit 2, the amount ($T_1-T_3$) that exceeds the torque $T_3$ required to drive the load 1 is transmitted back to the second input unit 3 from the combination unit 5 by way of the decelerator 4 as shown in FIG. 2 This then rotates the rotor of the electric motor which makes up the second input unit 3. As a result, the driving torque $T_1$ that is applied to the first input unit 2 is not efficiently used for driving the load 1, and the force required to generate the driving torque $T_1$ by the first input unit 2 (for example the force required to press the pedal) becomes uselessly larger.

Conventionally, to solve this kind of problem, a single-direction clutch is placed between the decelerator 4 and the combination unit 5, so that power is transmitted only in the direction of the combination unit 5 from the decelerator 4. On the other hand, by changing the decelerator 4 from a normal fiction-roller type to a wedge-roller type, it is possible to omit the single-direction clutch as disclosed in Japanese Patent Publication Tokukai Hei No. 9-061329.

FIG. 3 shows a construction of this kind of friction-roller speed changer -of the wedge-roller type.

This friction-roller speed changer of the wedge-roller type comprises a center roller 7, whose outer surface is a first cylindrical surface 6, aid an outer ring 9 whose inner surface is a second cylindrical surface 8, and which is located around the center roller 7 to rotate freely with respect to the center roller 7. The center roller 7 is fixed to one end of a first rotating shaft so that it is concentric with the first rotating shaft, and the end of a second rotating shaft is coupled with and fixed to the outer ring 9 so that it is concentric with the outer ring 9.

In the annular space 10 between the first cylindrical surface 6 and the second cylindrical surface 8, there are three shafts 11a, 11b which are located so as to be parallel with the center roller 7 and outer ring 9, and these shafts 11a, 11b rotatably support intermediate rollers 12a, 12b, 12c. The outer peripheral surface of each of these intermediate rollers 12a, 12b, 12c is a third cylindrical surface 13 where each third cylindrical surface 13 comes in contact with the first and second cylindrical surfaces 6 and 8. Moreover, by making the center of the center roller 7 and the center of the outer ring 9 eccentric with each other, the width of the annular space 10 is uneven in the circumferential direction.

Of the three intermediate rollers, 12a, 12b, 12c, the intermediate roller 12a is a wedge roller that is supported so that it freely move a little hi the circumferential direction in the annular space 10, and through the use of a spring 14, that is pressure or biasing means, the wedge-roller or intermediate roller 12a is elastically pressed in the direction to the narrow width portion of the annular space 10.

When transmitting a rotational force using a friction-roller-type speed changer that is constructed as described above, if the center roller 7 is rotated in the clockwise direction as indicated by the arrow "α" in FIG. 3, the wedge roller or intermediate roller 12a rotates in the counterclockwise direction as indicated by the arrow "β" with shaft 11a as the center, and the outer ring 9 also rotates in the counterclockwise direction as indicated by the arrow "γ".

Here, the intermediate roller 12a rotates as shown by the arrow "β", and both the center roller 7 and the outer ring 9, which hold the intermediate roller 12a therebetween, rotate in opposite directions, "α" and "γ", and as a result the entire intermediate roller 12a has a tendency to move in the clockwise direction of FIG. 3 as indicated by the arrow "γ". In other words, the intermediate roller 12a receives a force in the direction of arrow "γ" from the center roller 7 which rotates in the direction of arrow "α", and the intermediate roller 12a per se rotates in the direction of arrow "β", and by so doing, the intermediate roller 12a receives a force in the direction for arrow "γ" from the reaction received from the point of contact with the second cylindrical surface 8 that is formed on the inner peripheral surface of the outer ring 9.

As a result, as the center roller 7 rotates, the intermediate roller 12a tends to move toward the narrow width area of the annular space 10. Also, the third cylindrical surface 13 that is formed on the outer peripheral silence of this intermediate roller 12a strongly presses against the first cylindrical surface 6 which is formed around the outer peripheral surface of the center roller 7, and the second cylindrical surface 8 which is formed around the inner peripheral surface of the outer ring 9. As a result, the contact pressure at the radially inner contact point 15, where the third cylindrical surface 13 comes in contact with the first cylindrical surface 6, and at the radially outer contact point 16, where the third cylindrical surface 13 comes in contact with the second cylindrical surface 8, becomes greater.

As the contact pressure at both the inner and outer contact points 15 and 16 of the wedge roller or intermediate roller 12a becomes greater, at least one of the center roller 7 and outer ring 9, that are respectively pressed by the third cylindrical surface formed around the outer peripheral surface of the intermediate roller 12a, is displaced a little, due to an installation gap or to elastic deformation, in the respective radial direction.

As a result, the contact pressure becomes higher at two radially inner contact points 15 where the third cylindrical surfaces 13 that are formed around the outer peripheral surfaces of the remaining intermediate rollers 12b, 12c come in contact with the first cylindrical surface 6, and at two radially outer contact points 16 where these third cylindrical surfaces 13 come in contact with the second cylindrical surface 8.

The force which moves the intermediate roller 12a, which functions as a wedge roller, in the direction of the narrow width area of the annular space 10 varies according to the size of the torque that is transmitted from the center roller 7 to the outer ring 9. Moreover, as this force becomes large, the contact pressure at the radially inner and outer contact points 15 and 16 becomes greater. Therefore, the transmission efficiency of the fiction-roller-type speed changer is maintained by automatically selecting a contact pressure that corresponds to the transmission torque.

The above was an example of using the friction-roller-type speed changer as a decelerator, where the center roller 7 was taken to be the input side and the outer ring 9 was taken to be the output side. Conversely, if the friction-roller-type speed changer is used as an accelerator by taking the outer ring 9 to be the input side and the center roller 7 to be the output side, except that the direction of rotation is opposite, the other action is the same, and it is possible to transmit power between the outer ring 9 and the center roller 7, while at the same time maintaining the transmission efficiency of the friction-roller-speed changer by automatically selecting a contact pressure that corresponds to the transmitted torque.

If the members on the output side rotate at a higher speed than the speed which corresponds to the members on the input side, the intermediate roller 12a which functions as a wedge roller, tends to move in the direction to the wide portion in tile annular space 10, and the contact pressure at the radially inner contact points 15 and radially outer contact points 16 is lost, and transmission of power between the center roller 7 and the outer ring 9 is broken.

In other words, when the friction-roller speed changer is used as a decelerator, if the outer ring 9 rotates in the direction of arrow "γ" in FIG. 3 while the center roller 7 is stopped, the intermediate roller 12a tends to move in the direction to the wide area in the annular space 10 against the elastic force of the spring 14. When the friction-roller speed changer is used as an accelerator as well, if the center roller 7 rotates in the direction opposite to the arrow "α" in FIG. 3 while the outer ring 9 is stopped, the intermediate roller 12a tends to move in the direction to the wide area in the annular space 10 against the elastic force of the spring 14.

In the case of a wedge-roller type friction-roller speed changer when the output member rotates at a higher speed than the speed that corresponds to the input member, power transmission between the center roller 7 and outer ring 9 is broken off. Therefore, in the drive system shown in FIGS. 1 and 2, even if the single-direction clutch between the decelerator 4 and the combination unit 5 is omitted, it is possible to prevent the drive force that is applied to the first input unit 2 due to the existence of the electric motor or second input unit 3 from becoming uselessly large.

As in the case of an auxiliary-powered bicycle, if the construction is such that the direction of the driving force applied to the load 1 is set, then by using the friction-roller speed changer of the wedge-roller type as shown in FIG. 3 as a decelerator 4, it is possible to both reduce cost by omitting the single-direction clutch and to maintain the transmission efficiency by optimizing the contact pressure. On the other hand, if the direction of the driving force to be applied to the load 1 is not set, then the friction-roller speed changer as shown in FIG. 3 cannot be used. In other words, with the friction-roller speed changer shown in FIG. 3, if the direction of rotation of the transmitted power is reversed, then the intermediate roller 12a, which functions as a wedge roller, tends to move in the direction to the wide area in the annular space 10, and the contact pressure at the radially inner contact points 15 and the radially outer contact points 16 is lost, and power is not transmitted between the center roller 7 and the outer ring 9. For example, the friction-roller speed changer of FIG. 3 cannot be used in a device that is driven by stepping on a pedal, such as in an amusement park ride or a pedal boat, or where it is possible to turn the pedals in both directions.

In this kind of situation, a friction-roller speed changer is used that is constructed as shown in FIG. 4, where there are three intermediate rollers 12a, 12b and 12c, of which the intermediate rollers 12a and 12b function as wedge rollers. FIG. 4 shows the friction-roller speed changer that is disclosed on U.S. Pat. No. 4,709,589. In this second example of a friction-roller speed changer, two intermediate rollers 12a, 12b of the three intermediate rollers 12a, 12b, 12c are supported so that they can each move a little in the circumferential direction of the annular space 10, and act as wedge rollers.

Moreover, these two intermediate rollers 12a, 12b, which act as wedge rollers, are elastically pressed toward the narrow width area of the annular space 10 by springs 14, respectively, in substantially opposite circumferential directions (move toward each other). With the construction of this second example, regardless of the direction of the relative rotation of the center roller 7 and outer ring 9, one of the two intermediate rollers 12a, 12b, which act as wedge rollers, is wedged into the narrow width area of the annular space 10, and maintains the contact pressure at the radially inner contact points 15 and radially outer contact points 16. Therefore, regardless of the direction of rotation of the transmitted power, it is possible to maintain the transmission efficiency by optimizing the contact pressure.

In the case of a friction-roller speed changer, as shown in FIG. 4, that is capable of maintaining the transmission efficiency regardless of the direction of rotation of the transmitted power, if the driving torque that $T_1$ that is applied by the first input unit 2 is greater than the torque $T_3$ that is required to drive the load 1 ($T_1 > T_3$) as shown in FIG. 4 as described above, then the force required to generate the driving torque $T_1$ at the first input unit 2 becomes uselessly greater. In other words, in the case of the friction-roller speed changer shown in FIG. 4, regardless of the relative direction of rotation between the center roller 7 and the outer ring 9, power is constantly transmitted between the center roller 7 and the outer ring 9. Accordingly, if the driving torque $T_1$ that is applied at the first input unit 2 is greater than the torque $T_3$ required to drive the load 1, the electric motor, which makes up the second input unit 3, in addition to the load 1 must be driven by the power applied from the first input unit 2 through human power. As a result, the force that must be applied at the first input unit 2 becomes uselessly larger, and this is undesirable.

In the friction-roller speed changer having a single intermediate roller 12a as the wedge roller as shown in FIG. 3, when the rotational force is added in a reversed direction from the side of load 1, it is impossible to separate the load 1 from the second input unit 3 (FIGS. 1 and 2). For example, when moving back the auxiliarily powered bicycle, the outer ring 9 (FIG. 3), that is the decelerator 4, tends to be rotated in a clockwise direction in FIG. 3 (opposite direction to the arrow γ in FIG. 3) by the rear wheel 1 of the bicycle, that is load, by means of a chain and crank shaft.

In this case, the intermediate roller 12a tends to move toward the narrower area of the annular space 10 to transmit the rotational force to the center roller 7 from the outer ring 9. Consequently, when moving back the auxiliarily powered bicycle, the electric motor, that is the second input unit 3, must be rotated, and by that amount, the force required to move back the bicycle is larger.

U.S. Pat. No. 4,481,842 discloses a structure to shut off the power transmission when the torque that is to be transmitted through the friction-roller speed changer is at a predetermined value or more.

However, in this structure, if the torque is below the predetermined valve, the power is transmitted even when it is not desired. On the contrary, when the torque is the predetermined value or more, the power transmission is shut off even when the power transmission is required. Therefore, the structure does not make sense in solving the problems as mentioned above.

SUMMARY OF THE INVENTION

An object of the present invention is to provide a friction-roller speed changer to solve this problem.

Another object of the present invention is to provide a friction-roller speed changer with transmission efficiency improved while preventing the useless application of resistance.

Another object of the present invention is to provide a friction-roller speed changer wherein whether power transmission is carried out or not is freely selected.

BRIEF DESCRIPTION OF THE DRAWINGS

FIG. 19 is a cross-sectional view taken along the line IXX—IXX of FIG. 16 to show the state where the solenoid is turned on.

DETAILED DESCRIPTION OF THE INVENTION

Figure 4:
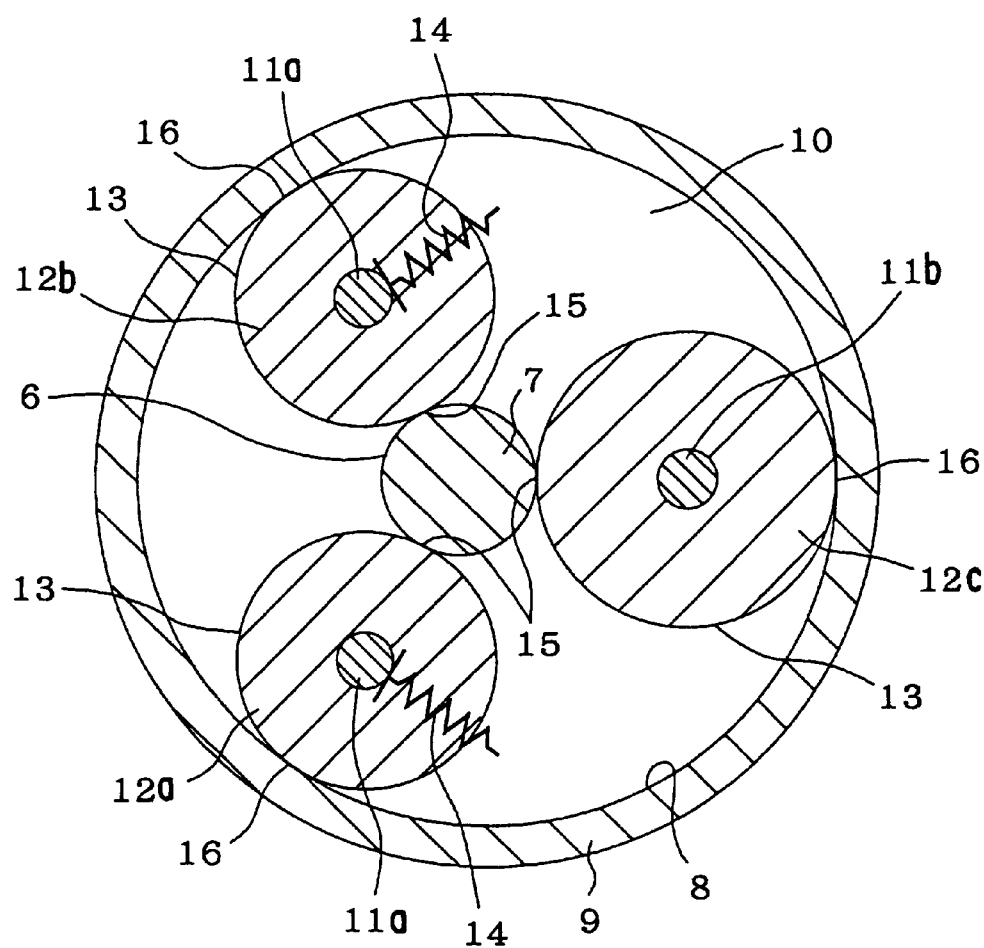
FIG. 4 is similar to FIG. 6 and shows a second example of a conventional friction-roller speed changer.

The friction-roller speed changer of this invention in one feature is similar in construction to the second example of a friction-roller speed changer as shown FIG. 4, in that it comprises a first rotating shaft, a center roller which is attached to the end of the first rotating shad so that it is concentric with the first rotating shaft, and whose outer peripheral surface forms a first cylindrical surface, an outer ring whose inner peripheral surface forms a second cylindrical surface and which is provided around the center roller to freely rotate with respect to the center roller, a second rotating shaft provided concentric with the outer ring and having one end portion securely connected to the outer ring, at least three shafts that are arranged inside the annular space between the first cylindrical surface and second cylindrical surface so as to be parallel with the first rotating shaft, and at least three intermediate rollers which are rotatably supported by these three shafts, respectively, and whose outer peripheral surfaces each form a third cylindrical surface. Also, by making the center of the first rotating shaft eccentric with the center of the second rotating shaft and outer ring, the width of the annular space becomes unequal in the circumferential direction to provide narrower and wider areas in the annular space.

Moreover, two of the at least three intermediate rollers care supported so that they can be displaced a little in the circumferential direction of the annular space and act as wedge rollers, and a pressure means is used in order to elastically press these two intermediate rollers, which act as wedge rollers, toward the narrower width area of the annular space in opposite directions from each other in the substantially circumferential direction.

Particularly in the friction-roller speed changer of this invention, there is a selective pressure means for pressing one of the two intermediate rollers which act as wedge rollers, in the direction of the wider area of the annular space against the elastic force of the pressure means. Through this selective pressure means, one of the two intermediate rollers or wedge rollers, is pressed toward the wider area of the annular space.

In the friction-roller speed changer of this invention, constructed as described above, only the intermediate roller that acts as a wedge roller when transmitting the rotating drive force that is applied at the input side in the normal state, is elastically pressed in the direction to the narrower width area of the annular space by an elastic member. The intermediate roller that does not act as a wedge roller when transmitting the rotating drive force that is applied at the input side in the normal state, is pressed in the direction to the wider area of the annular space against the force of an elastic member by a selective pressure means. Therefore, the rpm of the input side becomes less than the rpm which corresponds to the rpm of the output side, and even if there is a tendency for a backflow of power from the output side to the input side, the contact pressure between the intermediate rollers and the first thru third cylindrical surfaces does not increase, making it possible to prevent backflow of power from tile driven unit or output side to the drive unit or input side.

Now, FIGS. 5 thru 10 show a first example of the embodiments of this invention. The friction-roller speed changer 17 of this invention is equipped with a housing 18. This housing 18 is attached to the frame etc. (not shown in the figures) and covers the center roller 7, which is integrally fixed to the end of the rotating drive shaft 20 of the electric motor 19 of the second input unit so that it is concentric with this rotating drive shaft 20. The rotating drive shaft 20 corresponds to the first rotating shaft or second rotating shaft in the present specification. The housing 18 comprises a main body 21 that is cylindrical with a bottom, and a cover 22 that covers the opening on the base end of the main body 21. The center roller 7 is inserted into the housing 18 through a hole 23 that is formed just off center from the center of the cover 22. Moreover, a bearing 24 is located between the inner peripheral surface of this hole 23 and the outer peripheral surface of the base end portion of the center roller 7.

Figure 5:
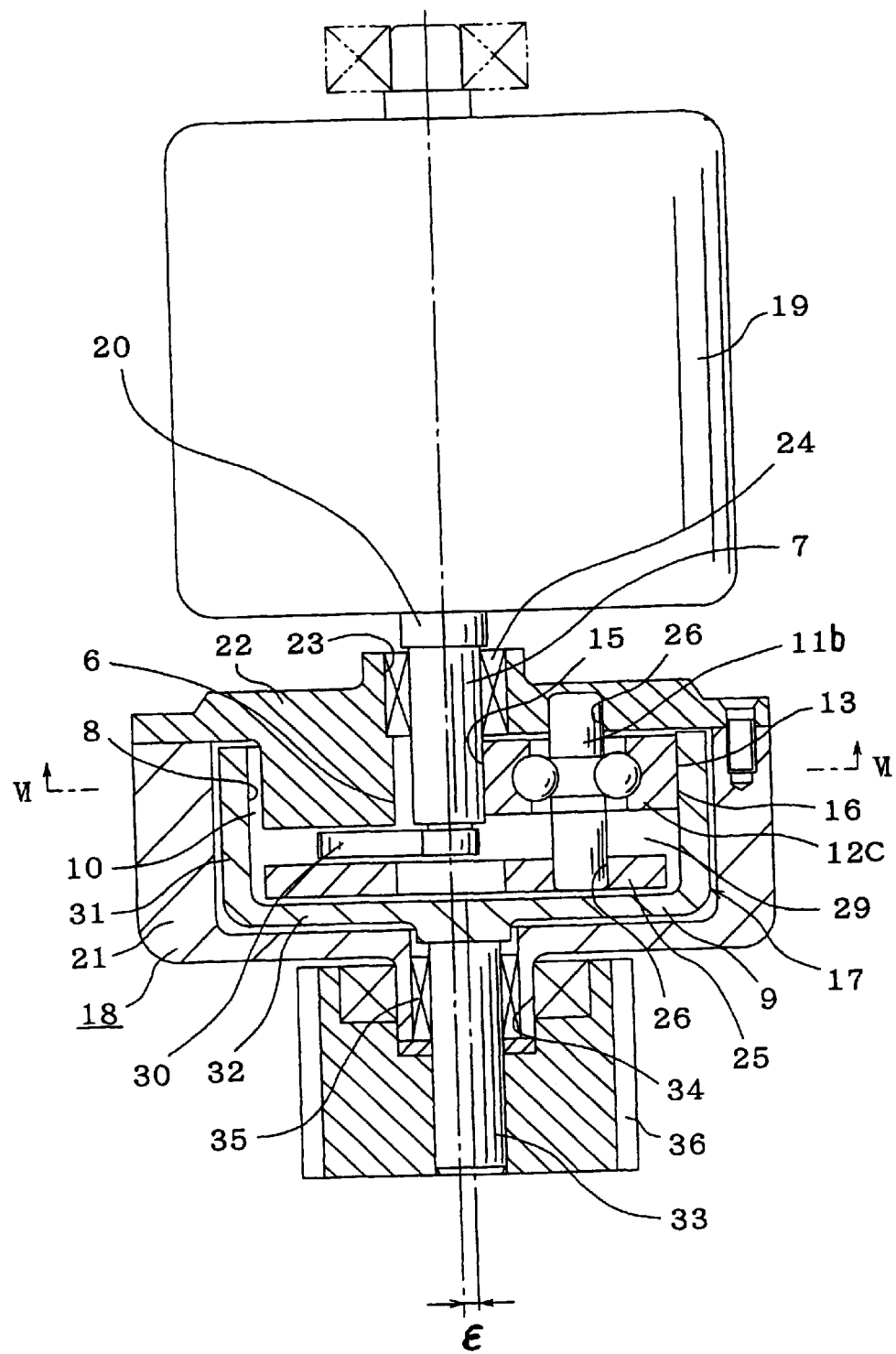
FIG. 5 is a cross-sectional view that shows a first example of the embodiments of this invention.

Provided at a portion on the inside of the housing 18 and surrounding the center roller 7 are three shafts 11a, 11b, which are arranged in parallel with the center roller 7. In other words, one end of each of these shafts 11a, 11b (top end in FIGS. 5 and 8) is supported by the cover 22, and the other end (bottom end in FIGS. 5 and 4) is supported by a connection plate 25. Of these three shafts 11a, 11b, the shaft 11b, as shown in the FIG. 5, is fixed so that it does not move by pressure fitting or without play with both ends thereof inserted in holes 26 that are formed in the cover 22 and connection plate 25. Therefore, this shaft 11b does not move in the circumferential or radial direction inside the housing 18.

Figure 8:
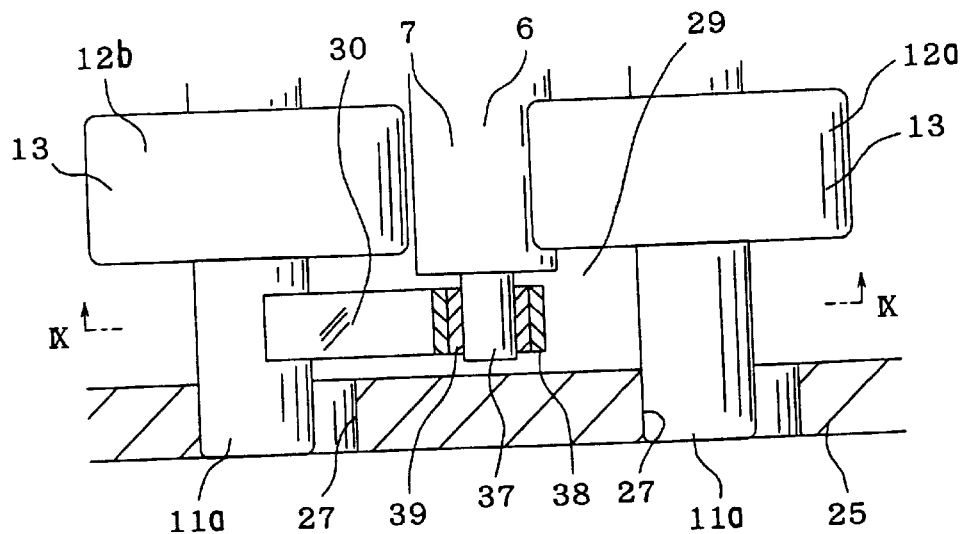
FIG. 8 is a cross-sectional view of section VIII—VIII of FIG. 9, and shows the construction of the part which selectively applies pressure to a pair of intermediate rollers which act as wedge rollers.

The remaining two shafts 11a are supported by the cover 22 and connection plate 25 so that the both ends thereof can freely move a little in the circumferential and radial directions inside the housing 18. Therefore, as shown in FIG. 8, in the parts of the cover 22 and connection plate 25 that are in alignment with both ends of the shafts 11a, there are support holes 27 that are round with an inner diameter larger than the outer diameter of the both ends of the shafts 11a, or that are long in the circumferential direction of the cover 22 and connection plate 25, and both ends of the shafts 11a loosely fit into these support holes 27. Also, these shafts 11a, 11b support rotatably the intermediate rollers, 12a, 12b, 12c.

The intermediate rollers 12a, 12b, 12c are supported so that they do not move in the axial direction with respect to the shafts 11a, 11b which rotatably support them. Therefore, the intermediate rollers 12a, 12b, 12c are fixed around the shafts 11a, 11b, so that these intermediate rollers 12a, 12b, 12c rotate freely with the shafts 11a, 11b, or the shafts 11a, 11b are made stationary, and instead the intermediate rollers 12a, 12b, 12c are supported around the shafts 11a, 11b so that they rotate freely by way of deep groove-shaped ball bearings as shown in FIG. 5.

Part of the connection plate 25 is joined to protrusions located on part of the inside surface of the cover 22 (bottom surface in FIG. 5 on the side where the intermediate rollers 12a, 12b, 12c are installed) at a location separated the intermediate rollers 12a, 12b, 12c. (The protrusions are disclosed in U.S. Pat. No. 4,709,589 and so are not shown in the figure.)

Moreover, a gap 29 is formed between one side surface of the connection plate 25 (top surface in FIG. 5) and one side surface of the intermediate rollers 12a, 12b, 12c (bottom surface in FIG. 5) in the area between the shafts 11a which support the intermediate rollers 12a, 12b that act as wedge rollers. This gap 29 makes it possible for a pressure lever 30 (to be described later) to rock freely. Also, of the protrusions not shown in the figure, the protrusion that is located between the pair of shafts 11a is placed in the radially outer portion of the annular space 10 where the intermediate rollers 12a, 12b, 12c are located (further outward in the radial direction than the shafts 11a, 11a).

Moreover, on the inside of the housing 18, in the area that surrounds the intermediate rollers 12a, 12b, 12c, there is a rotatable cylindrical outer ring 9 that has a bottom. This outer ring 9 comprises a cylindrical section 31 and a circular disc plate 32 that covers the opening at one end (bottom end in FIG. 5) of the cylindrical section 31. The inner peripheral surface of the cylindrical section 31 forms a smooth second cylindrical surface 8 which comes in contact with a smooth third cylindrical surfaces 13 which are formed on the outer peripheral surfaces of the intermediate rollers 12a, 12b, 12c. Also, the base end (the top end in FIG. 5) of an output shaft 33 is connected to the outer surface of the disc plate section 32 (the surface opposite of the space where the intermediate rollers 12a, 12b, 12c are located, or the lower surface in FIG. 5). This output shaft 33 corresponds to the second rotating shaft or first rotating shaft in the present application. Moreover, this output shaft 33 protrudes out from the housing 18 through a second through hole 34 that is formed in the center portion of the main body 21 of the housing 18.

A bearing 35 is located between the outer peripheral surface at a base end portion of the output shaft 33 and the inner peripheral surface of the second through hole 34, so that the outer ring 9 and output shaft 33 are supported so as to rotate freely with respect to the housing 18. Also, a gear 36 for retrieving the power is attached around the tip half portion of the output shaft 33 (lower half portion in FIG. 5), in the part that protrudes out from the housing 18.

The outer peripheral surfaces of the intermediate rollers 12a, 12b, 12c come in contact with the outer peripheral surface of the center roller 7 and the inner peripheral surface of the outer ring 9.

In the friction-roller speed changer of this invention, similar to the second example of the prior friction-roller speed changer shown in FIG. 4, the center of the center roller 7 is eccentric with reference to the centers of the output shaft 33 and outer ring 9 In other words, as described above, the through hole 23, through which the center roller 7 is inserted, is located just a little off center from the center of the housing 18, and the second through hole 34, through which the output shaft 33 passes, is located in the center of the housing 18. Furthermore, the output shaft 33 that is supported on the inside of the second through hole 34 is concentric with the outer ring 9. Therefore, the center roller 7 is eccentric with reference to the outer ring 9 and output shaft 33 by the amount "ε" that the through hole 23 is separated from the center of the housing 18. Also, the dimension of the width of the annular space 10 between the outer peripheral surface of the center roller 7 and the inner peripheral surface of the outer ring 9, where the intermediate rollers 12a, 12b, 12c are located, is unequal in the circumferential direction by the amount corresponding to this eccentricity "ε".

Therefore, the intermediate rollers 12a, 12b, 12c have different outer diameters by the amount that the width size of the annular space 10 is unequal in the circumferential direction. In other words, the intermediate rollers 12a, 12b, which act as wedge rollers and which are located on the side where the center roller 7 is eccentric with respect to the outer ring 9 (left side in FIG. 6), have the same relatively small diameter.

On the other hand, the intermediate roller 12c, which acts as a guide roller and which is located on the opposite side from the center roller 7 which is eccentric with respect to the outer ring 9 (right side in FIG. 6), has a larger diameter than the diameters of the two intermediate rollers 12a, 12b, which act as wedge rollers.

Moreover, the third cylindrical surfaces 13 which are formed around the outer peripheral surfaces of these three intermediate rollers 12a, 12b, 12c, come in contact with the first cylindrical surface 6 formed around the outer peripheral surface of the center roller 7, and with the second cylindrical surface 8 formed around the inner peripheral surface of the outer ring 9. The speed change ratio of the friction-roller speed changer 17 is determined from the ratio of the diameter of the first cylindrical surface 6 and diameter of the second cylindrical surface 8. Therefore, in order to obtain the required speed reduction ratio, it is possible to fit a sleeve around the tip end portion of the center roller 7 and to brig the outer peripheral surface of the sleeve in contact with the outer peripheral surfaces of the intermediate rollers 12a, 12b, 12c. In this case, the first cylindrical surface is formed by the outer peripheral surface of the sleeve.

Moreover, between the two intermediate rollers 12a, 12b, which act as wedge rollers, and the housing 18 or connecting plate 25, there is a pressure means or springs 14 that elastically press or bias the two intermediate rollers 12a, 12b toward the narrow width area of the annular space 10, in opposite directions from each other in the circumferential direction (toward each other).

Furthermore, in the fiction-roller speed changer 17 of this invention, there is a selective pressure means that presses one of the two intermediate rollers 12a, 12b, which act as wedge rollers, toward the wide area of the annular space 10 against the elastic force of the spring 14. In this embodiment, in order to construct this selective pressure means, the base end portion of a pressure lever 30 is friction fitted at the tip end portion of the center roller 7 in the part that sticks out from one side surfaces (lower surfaces in FIG. 4) of the intermediate rollers 12a, 12b, 12c. In other words, a small-diameter section 37 that is concentric with the center roller 7 is formed on the tip end portion of the center roller 7, and a fitting cylindrical portion 38 is formed in the base end portion of this pressure lever 30 and fitted onto and supported by this small-diameter section 37 though a friction sleeve 39. Therefore, when the center roller 7 is rotating, the pressure lever 30 tends to rotate in the same direction as the center roller 7 due to a torque that is determined based on the friction force between the inner and outer peripheral surfaces of the friction sleeve 39 and the outer peripheral surface of the small-diameter section 37 and the inner peripheral surface of the fitting cylindrical portion 38.

The pressure lever 30 freely moves in a rocking manner in the gap 29 in the circumferential direction of the annular space 10, so that the tip end portion of the pressure lever 30 abut against the shafts 11a that support the two intermediate rollers 12a, 12b which act as wedge roller. On the other hand, the elastic force of the springs 14 which presses these shafts 11a is relatively weak, such that if the pressure lever 30 is pressing against either one of tie shafts 11a, the intermediate roller 12a (or 12b) that is supported by that shaft 11a is pressed in the direction to the wide area in the annular space 10.

If rotational force is transmitted by a friction-roller speed changer constructed as described above, contact pressure is always maintained between the third cylindrical surfaces 13 which are formed around either one of the wedge rollers or intermediate rollers 12a (or 12b) and around the guide roller or intermediate roller 12c, and the first cylindrical surface 6 which is formed around the center roller 7, and the second cylindrical surface 8 which is formed around the outer ring 9.

Also, it is possible to efficiently transmit the rotational driving force from the center roller 7 to the outer ring 9 by way of either one of the intermediate rollers 12a (or 12b) and intermediate roller 12c. When doing this, the other intermediate roller 12b (or 12a) of the two intermediate rollers 12a, 12b, is moved toward the wide area of the annular space 10 by the pressure lever 30 which makes up the selective pressure means, and therefore it does not supply any rotational driving force to the outer ring 9 from the center roller 7.

Figure 9:
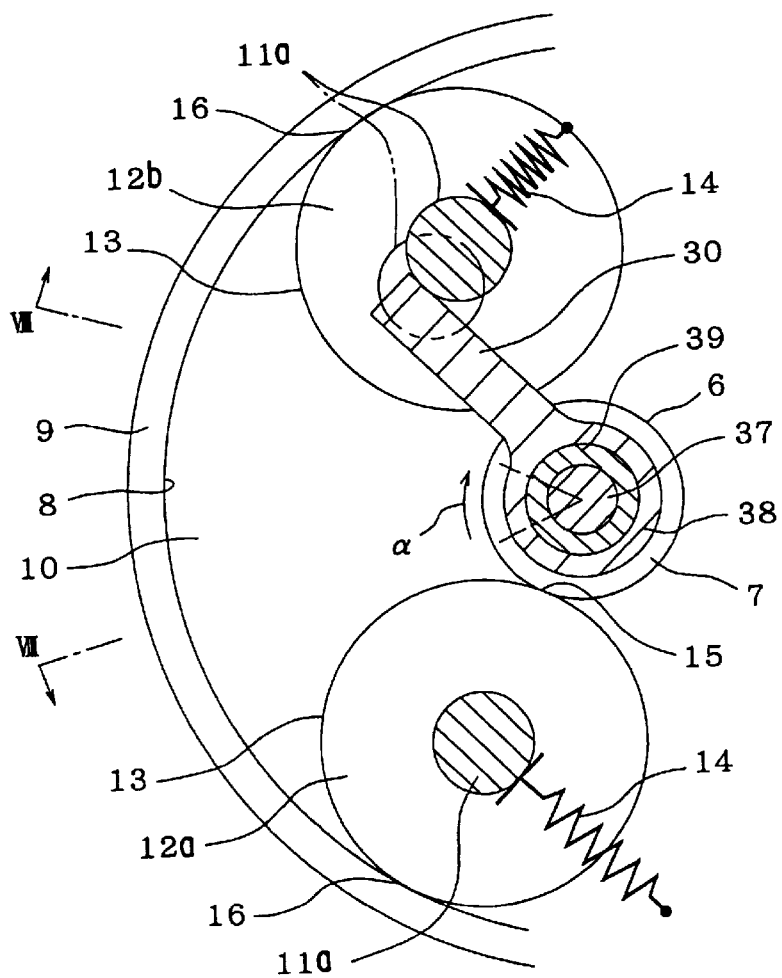
FIG. 9 is a cross-sectional view of section IX—IX of FIG. 8.

If, for example, the center roller rotates in the clockwise direction as shown by arrow "α" in FIG. 9, the intermediate roller 12a which is supported by one of the shafts 11a (lower one in FIGS. 9 and 10), is moved toward the narrow area of the annular space 10, and this intermediate roller 12a acts as a wedge roller and efficiently transmits the rotational driving force from the center roller 7 to the outer rig 9.

Figure 10:
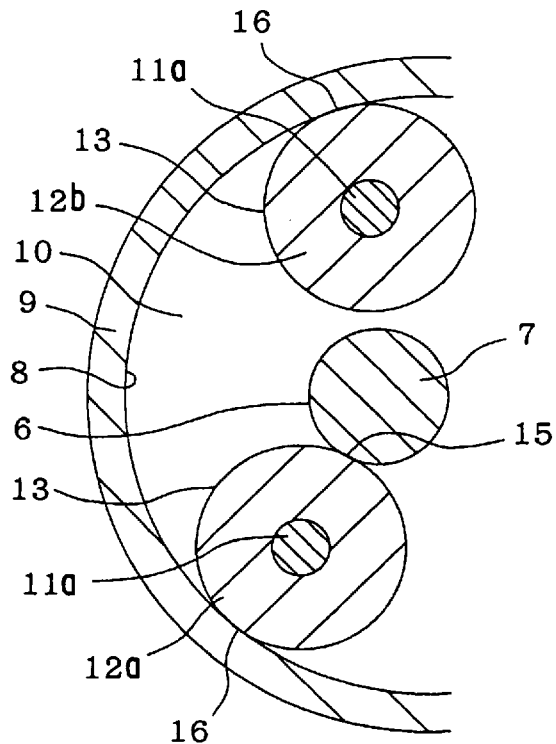
FIG. 10 is a view as seen from the same direction as FIG. 9, and shows the two states when the center roller rotates in different directions, and is used for explaining the function of the friction-roller speed changer of this invention.
Figure 10:
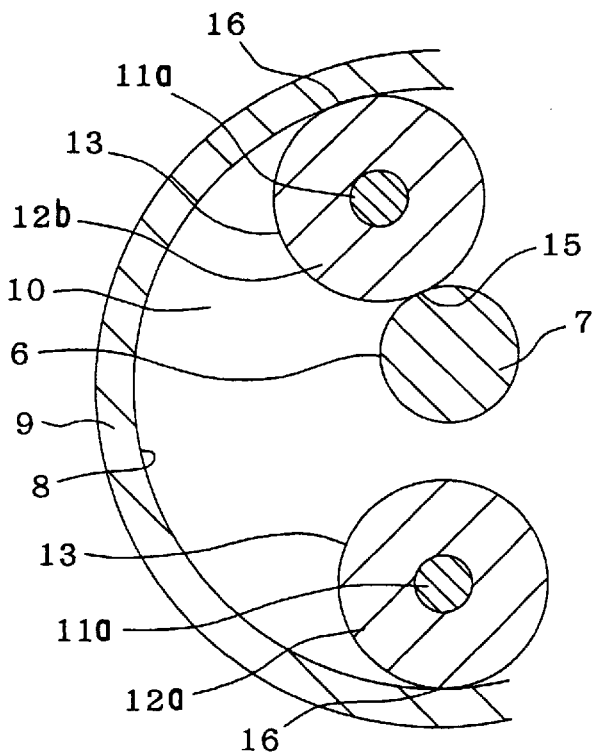

On the other hand, the other of the shafts 11a (upper one in the figure) is pressed by the pressure lever 30, so that the intermediate roller 12b, which is supported by this shaft 11a, is retracted toward the wide area of the annular space 10 as shown in FIG. 10 (A). In this state, if the speed that the output shaft 33 rotates the outer ring 9 becomes faster than the speed that the center roller 7 is trying to rotate the outer ring 9 (when the outer ring 9 in FIG. 10 (A) tends to relatively rotate in the counterclockwise direction with reference to the center roller 7), both of the two intermediate rollers 12a, 12b, which act as wedge rollers, are retracted toward the wide area of the annular space 10. In other words, in this state, the intermediate roller 12b, that is supported by the upper shaft 11a in FIGS. 9 and 10, is pressed by the pressure lever 30, and not only is it retracted toward the wide area of the annular space 10, but the intermediate roller 12a tends to be retracted toward the wide area of the annular space 10 by the rotational force that is applied from the outer ring 9.

Figure 7:
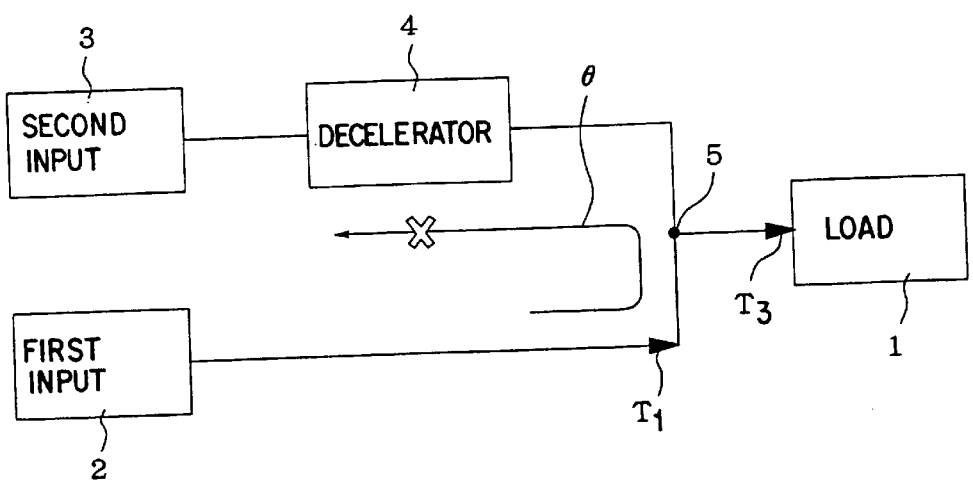
FIG. 7 is a block diagram of a driving unit with auxiliary power mechanism for explaining the function of the friction-roller speed changer of this invention.

As a result, the contact pressure between all of the third cylindrical surfaces 13 which are formed around the outer peripheral surfaces of all of the intermediate rollers 12a, 12b, 12c, and the first and second cylindrical surfaces 6, 8, becomes low, and transmission of the rotational driving force from the outer ring 9 to the center roller 7 stops. Therefore, the existence of the electric motor 19 applies no resistance to rotating the outer ring 9 from the side of the output shaft 33. In other words, as shown in FIG. 7, when the driving torque $T_1$, that is input from the first input unit 2, becomes larger than the torque $T_3$, that is required for driving the load 1, there is a tendency for a backflow of rotational driving force, as shown by arrow "θ" in the figure, from the first input unit 2 to the second input unit 3 where the electric motor 19 is located. However, even in this case, if the friction-roller speed changer 17 of this invention is used as a decelerator 4, then the backflow of rotational driving force is cut off by the decelerator 4, as shown by the "X" mark in the figure, so that it is possible to prevent the second input unit 3 from resisting the driving force that is applied from the first input unit 2.

Figure 6:
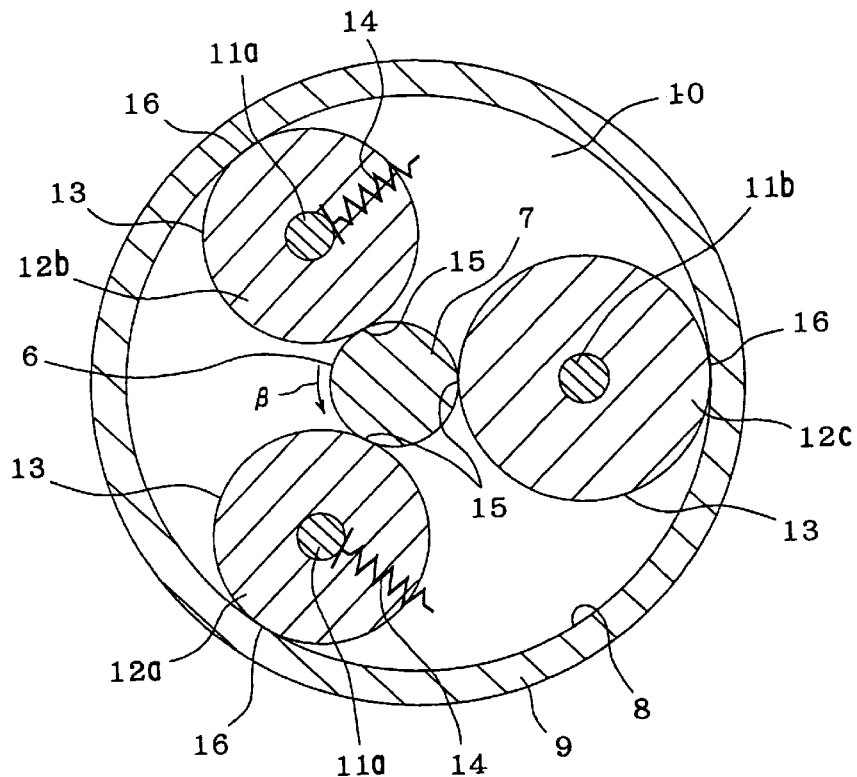
FIG. 6 is a cross-section view of section VI—VI of FIG. 5, and shows only the friction-roller speed changer.

On the other hand, if the center roller 7 rotates in the counterclockwise direction as shown by arrow "β" in FIG. 6, the intermediate roller 12b, that is supported by tile upper shaft 11a in FIGS. 6, 9 and 10, moves toward the narrow area of the annular space 10, and this intermediate roller 12b, which acts a wedge roller, and efficiently transmits the rotational driving force from the center roller 7 to the outer ring 9.

Here, the lower shafts 11a in FIGS. 6, 9 and 10 is biased by the pressure lever 30, and the intermediate roller 12a, that is supported by the lower shaft 11a in FIGS. 6, 9 and 10, is retracted toward the wide area of the annular space 10 as shown in FIG. 10 (B). In this case as well, backflow of rotational driving force is cut off by the decelerator 4, so that it is possible to prevent the second input unit 3 from resisting the driving force that is applied from the first input unit 2.

In the explanation above, the friction-roller speed changer 17 was used as a decelerator, however, even if it is used as an accelerator, by similar function, it is possible to prevent the second input unit 3 from resisting the driving force that is applied from the first input unit 2. If the friction-roller speed changer 17 is used as an accelerator, the outer ring 9 becomes the input side, and the center roller 7 becomes the output side.

Figure 11:
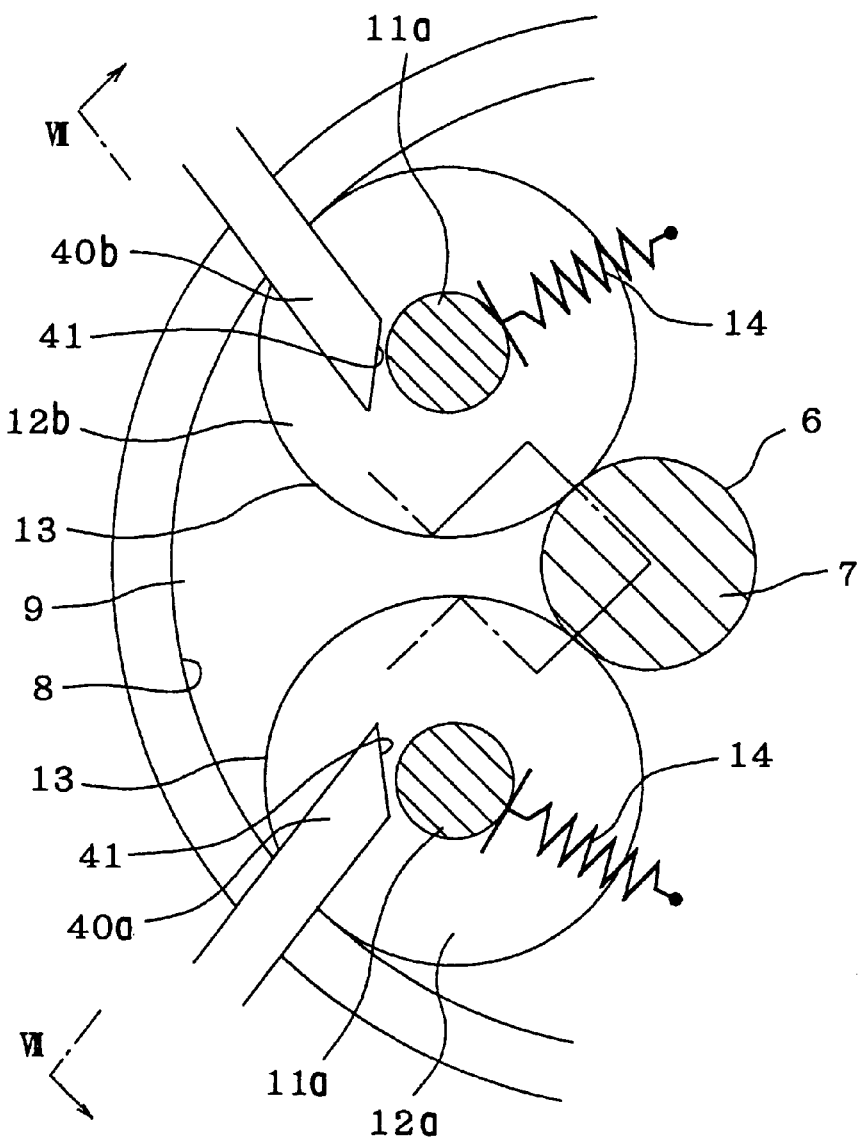
FIG. 11 is a view similar to that of FIG. 9 and shows a second example of the embodiments of the present invention.
Figure 12:
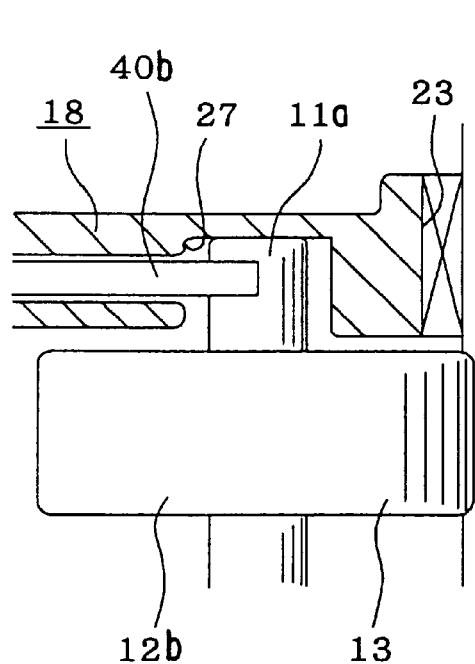
FIG. 12 is a cross-sectional view of section XII—XII of FIG. 11.
Figure 12:
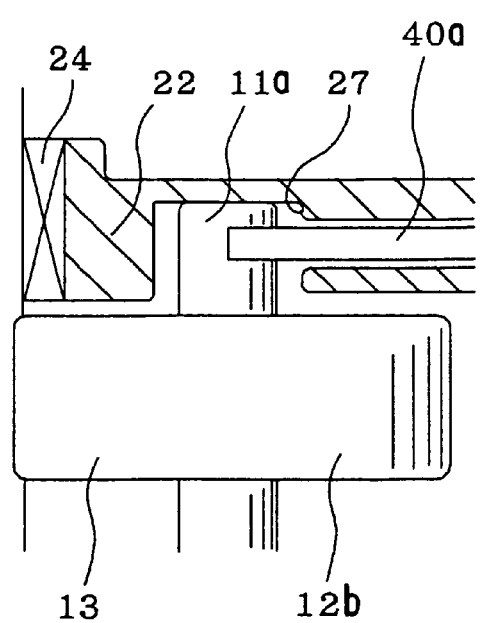
Figure 13:
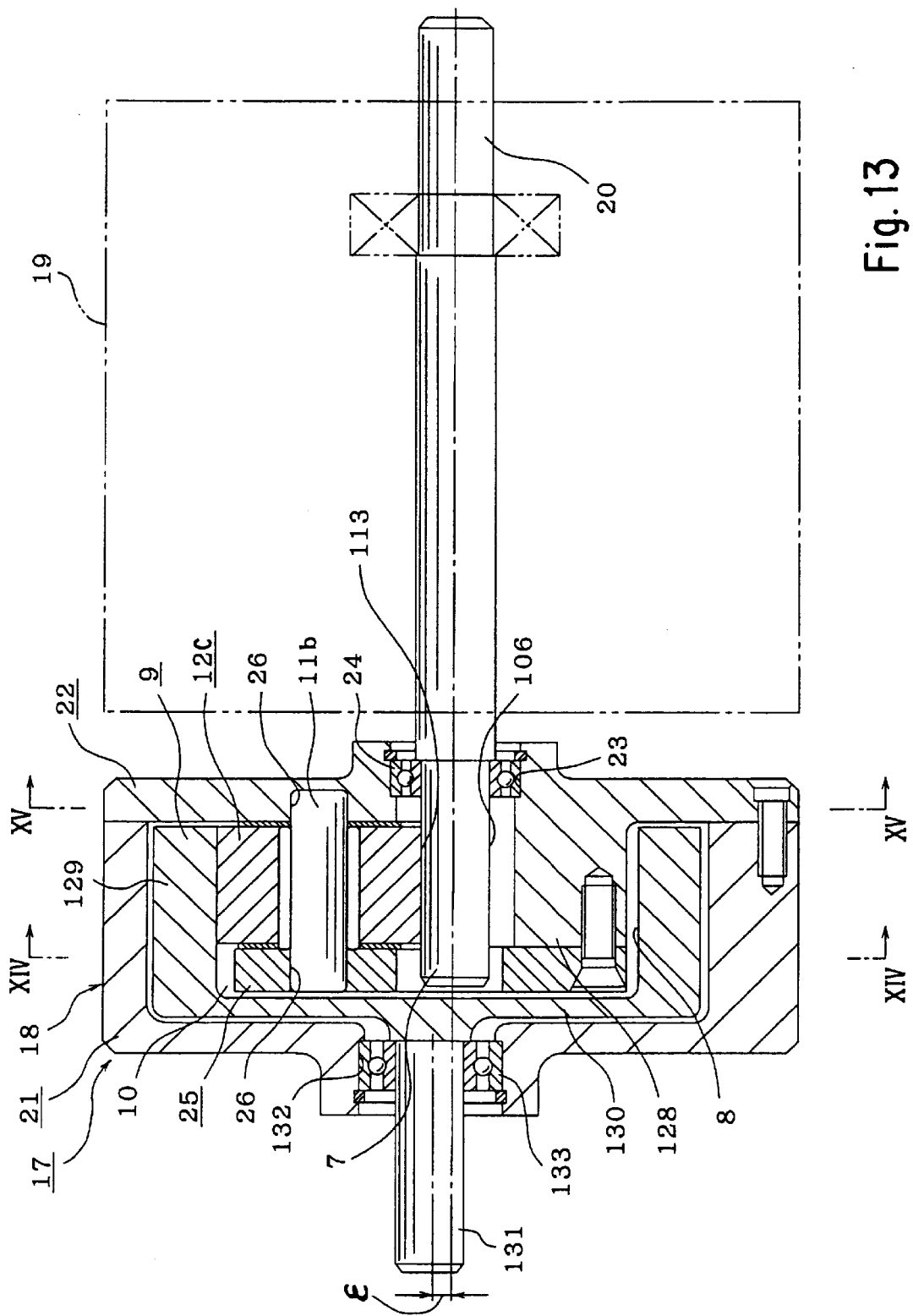
FIG. 13 is a cross-sectional view of another example of the embodiments in the present invention.

Next, FIGS. 11 and 12 show a second example of the invention. In this embodiment, on the part of the housing 18 that is separated in the axial direction from the outer rig 9, there is a pair of pressure arms 40a, 40b that are supported so as to move freely in the radial direction of the housing 18. Moreover, these pressure arms 40a, 40b are driven in the radial direction of the housing 18 by an actuator (not shown in the figures) such as a solenoid or air cylinder. A slanted surface 41 is formed on the tip end portions of these pressure arms 40a, 40b. Also, when the pressure arms 40a, 40b have been moved inward in the radial direction of the outer ring 9, the slanted surface 41 comes in contact with the outer peripheral surfaces of the shafts 11a, and this causes the wedge rollers or intermediate rollers 12a, 12b which are supported by the shafts 11a to retract toward the wide area of the annular space 10.

In this embodiment of the invention which is constructed as described above, the detection signal from a sensor which detects the direction of rotation of the center roller 7 (or outer ring 9) on the input side is input to a controller which controls the actuator. When power is transmitted from the input side, specifically center roller 7 (or outer ring 9) to the output side, specifically output ring 9 (or center roller 7), the intermediate roller 12a (or 12b) that does not act as a wedge roller must be retraced toward tie wide area of the annular space 10, and therefore the pressure arm 40a (or 40b) is pushed forward in the direction of the shaft 11 a which supports that intermediate roller 12a (or 12b). The other construction and functions are the same as that of the first embodiment.

The friction-roller speed changer of this invention is constructed and functions as described above, and makes it possible to improve the efficiency of auxiliary power supplied from a source such as an electric motor to a driven unit that rotates in both direction.

The friction-roller speed changer of this invention in another feature also comprises a first rotating shaft, a center roller which is attached to the end of the first rotating shaft so that it is concentric with the first rotating shaft, and whose outer peripheral surface forms a first cylindrical surface, an outer ring whose inner peripheral surface forms a second cylindrical surface and which is provided around the center roller to freely rotate with respect to the center roller, a second rotating shaft provided concentric with the outer ring and having one end portion securely connected to the outer ring, a plurality of shafts that are arranged inside the annular space between the first cylindrical surface and second cylindrical surface so as to be parallel with the first rotating shaft, and a plurality of intermediate rollers which are rotatably supported by the shafts, respectively, and whose outer peripheral surfaces each form a third cylindrical surface. Also, by making the center of the first rotating shaft eccentric with the center of the second rotating shaft and outer ring, the width of the annular space becomes unequal in the circumferential direction to provide narrower and wider areas in the annular space.

Moreover, at least one of the intermediate rollers is supported so as to be displaced a little in the circumferential direction of the annular space to act as a wedge roller, and a pressure means is used in order to elastically press the at least one intermediate roller, which acts as the wedge roller, toward the narrower width area of the annular space.

Particularly, the intermediate roller acting as the wedge roller, or the shaft for supporting the intermediate roller is made of a magnetic material or permanent magnet, and a solenoid is supported and fixed to face the intermediate roller or the shaft. The intermediate or wedge roller can be displaced toward the wider area of the annular space depending on whether the solenoid is turned on or off.

Accordingly, only the intermediate roller which is a wedge roller upon transmitting the rotational drive force added at the input side in the normal state is elastically pressed toward the narrower area of the annular space only when the rotational drive force is input from the input side in the normal state.

Consequently, except when the rotational drive force normally added at the input side in the normal state is transmitted, no rotational force is transmitted between the center roller and the outer ring.

Now, FIGS. 13 thru 19 show another example of the embodiments of this invention. The friction-roller speed changer 17 of this invention is equipped with a housing 18 which is made off a non-magnetic material such as aluminium alloy. This housing 18 is attached to the frame etc. (not shown in the figures) and covers the center roller 7, which is integrally fixed to the end of the rotating drive shaft 20 of the electric motor 19 of the second input unit so that it is concentric with this rotating drive shaft shaft 20. The rotating drive shaft 20 corresponds to the first rotating shaft or second rotating shaft in the present specifications. The housing 18 comprises a main body 21 that is cylindrical with a bottom, and a cover 22 that covers the opening on the base end of the main body 21. The center roller 7 is inserted into the housing 18 through a hole 23 that is formed almost at the center of the cover 22. Moreover, a bearing 24 is located between the inner peripheral surface of this hole 23 and the outer peripheral surface of the base end portion of the center roller 7.

Provided at a portion on the inside of the housing 18 and surrounding the center roller 7 are three shafts 11a, 11b, which are arranged in parallel with the center roller 7. In other words, one end of each of these shafts 11a, 11b (top end in FIGS. 13 and 16) is supported by the cover 22, and the other end (bottom end in FIGS. 13 and 16) is supported by a connection plate 25. Of these three shafts 11a, 11b, the two shafts 11b are fixed so as not to move by pressure fitting or without play with both ends thereof inserted in holes 26 that are formed in the cover 22 and connection plate 25. Therefore, the two shafts 11b do not move in the circumferential or radial direction inside the housing 18.

Figure 14:
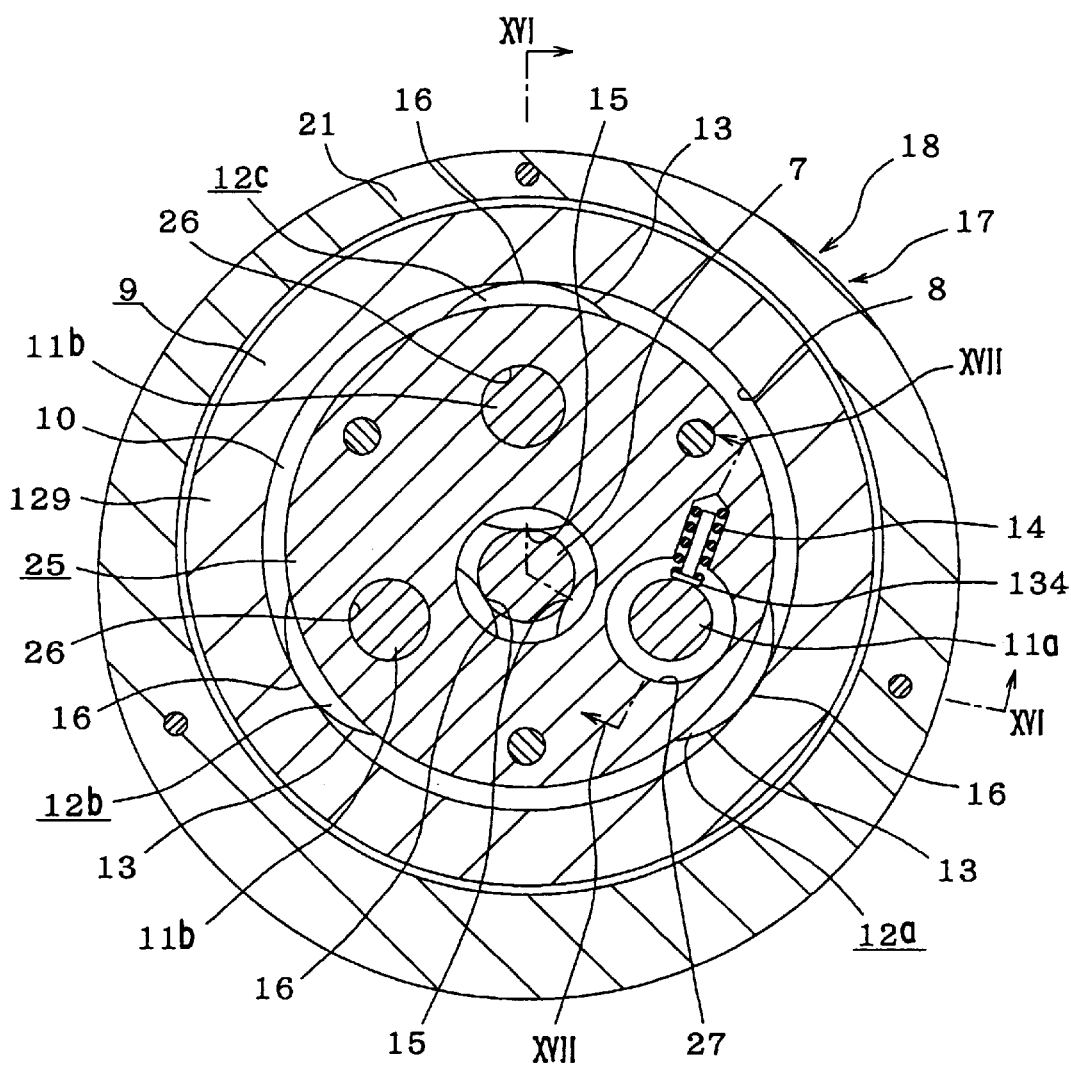
FIG. 14 is a cross-sectional view taken along the line XIV—XIV of FIG. 13.
Figure 15:
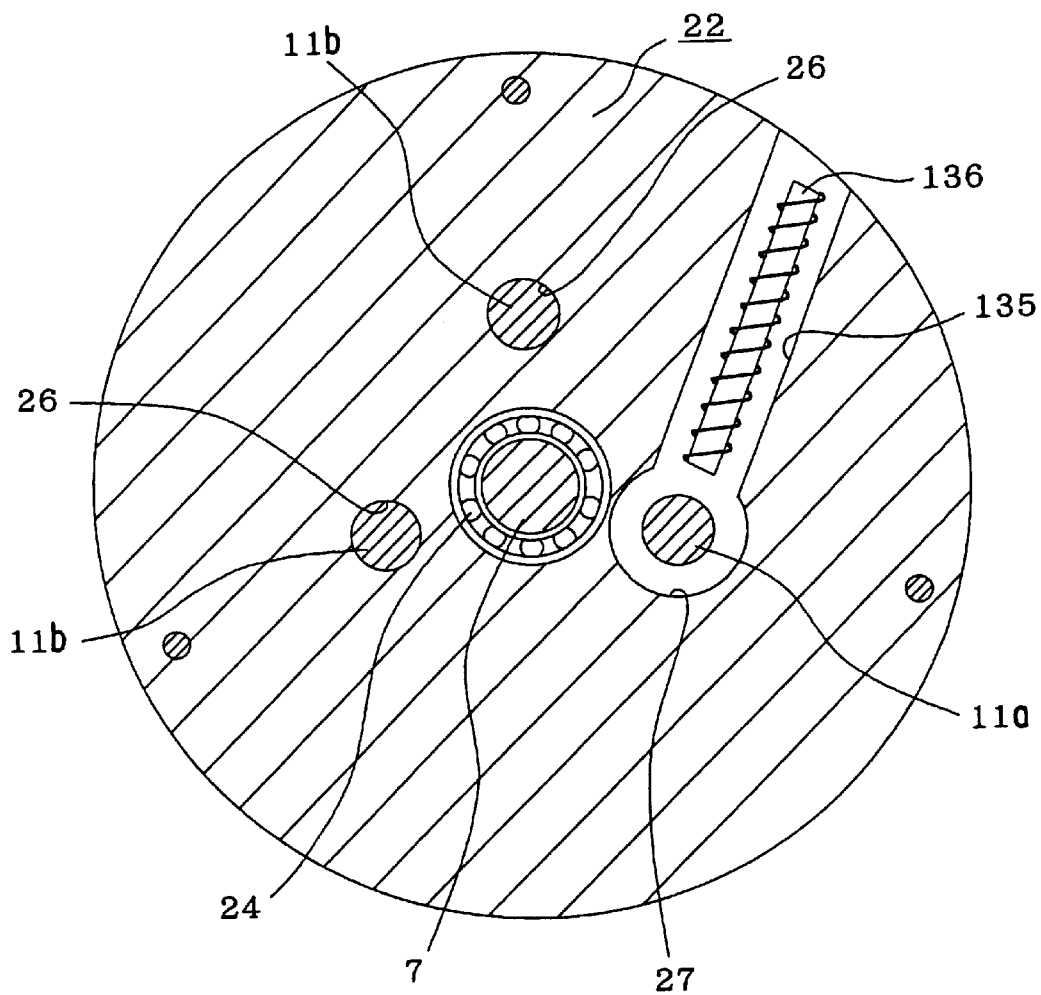
FIG. 15 is a cross-sectional view taken along the line XV—XV of FIG. 13.
Figure 16:
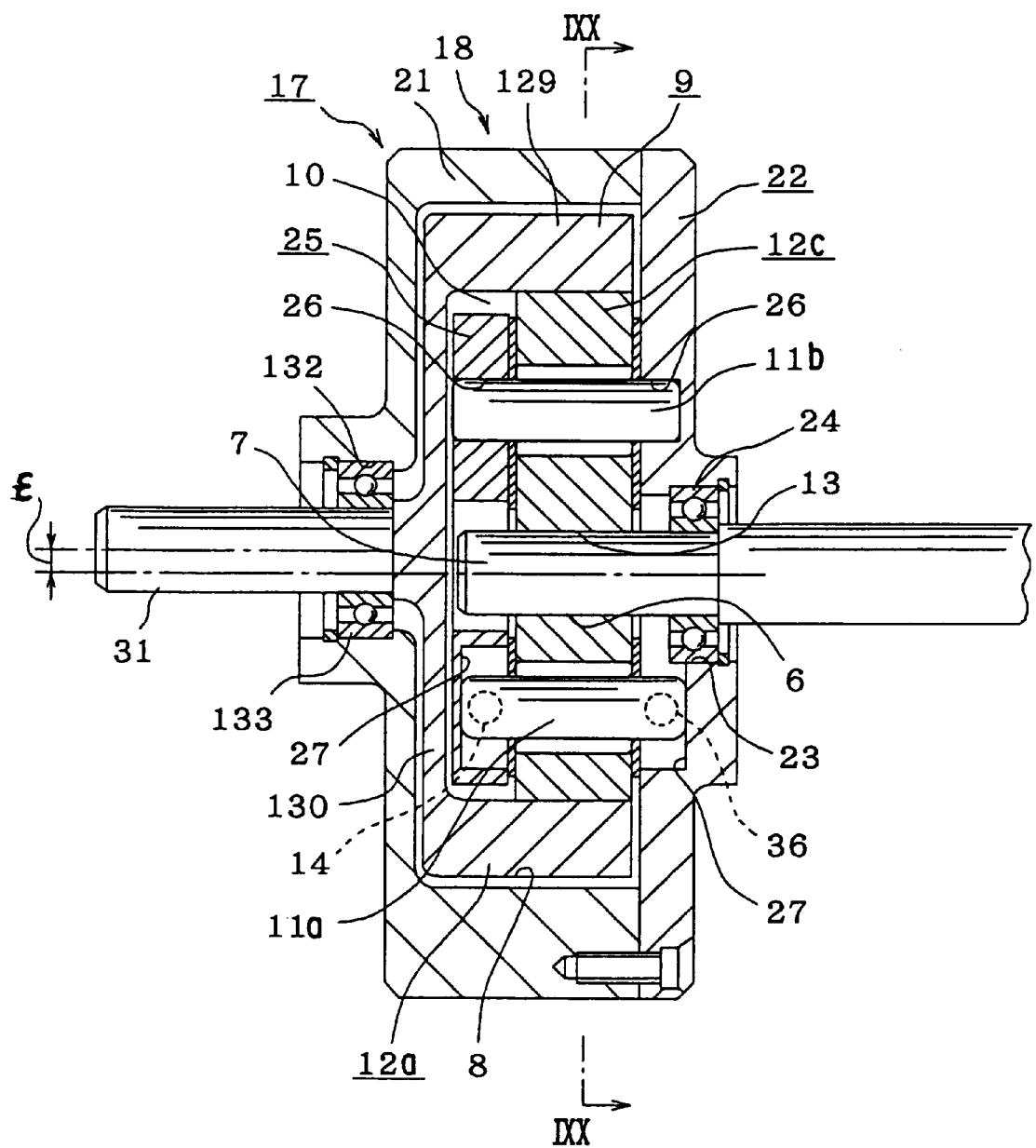
FIG. 16 is a cross-sectional view taken along the line XVI—XVI of FIG. 14.

The remaining single shaft 11a is supported by the cover 22 and connection plate 25 so that the both ends thereof can freely move a lite in the circumferential and radial directions inside the housing 18. Therefore, as shown in FIGS. 14 to 16, in the parts of the cover 22 and connection plate 25 that are in alignment with both ends of the shafts 11a, there are support holes 27 that are round with an inner diameter larger than the outer diameter of the both ends of the shafts 11a, or that are long in the circumferential direction of the cover 22 and connection plate 25, and both ends of the shafts 11a loosely fit into these support holes 27. Also, these shafts 11a, 11b support rotatably the intermediate rollers, 12a, 12b, 12c.

Incidentally, part of the connection plate 25 is joined to protrusions 128 located on part of the inside surface of the cover 22 (left surface in FIG. 13 on the side where the intermediate rollers 12a, 12b, 12c are installed) at a location separated the intermediate rollers 12a, 12b, 12c.

Moreover, on the inside of the housing 18, in the area that surrounds the intermediate rollers 12a, 12b, 12c, there is a rotatable cylindrical outer ring 9 that has a bottom. This outer ring 9 comprises a cylindrical section 129 and a circular disc plate 130 that covers the opening at one end (bottom end in FIGS. 13, 16) of the cylindrical section 129. The inner peripheral surface of the cylindrical section 129 forms a smooth second cylindrical surface 8 which comes in contact with a smooth third cylindrical surfaces 13 which are formed on the outer peripheral surfaces of the intermediate rollers 12a, 12b, 12c. Also, the base end (the top end in FIGS. 13, 16) of an output shaft 131 is connected to the outer surface of the disc plate section 130 (the surface opposite of the space where the intermediate rollers 12a, 12b, 12c are located, or the lower surface in FIGS. 13, 16). This output shaft 131 corresponds to the second rotating shaft or first rotating shaft in the present application. Moreover, this output shaft 131 protrudes out from the housing 18 through a second through hole 132 that is formed in the center portion of the main body. 21 of the housing 18.

A bearing 133 is located between the outer peripheral surface at a base end portion of the output shaft 131 and the inner peripheral surface of the second through hole 132, so that the outer ring 9 and output shaft 131 are supported so as to rotate freely with respect to the housing 18.

The outer peripheral surfaces of the intermediate rollers 12a, 12b, 12c come in contact with the outer peripheral surface of the center roller 7 and the inner peripheral surface of the outer ring 9.

Figure 1:
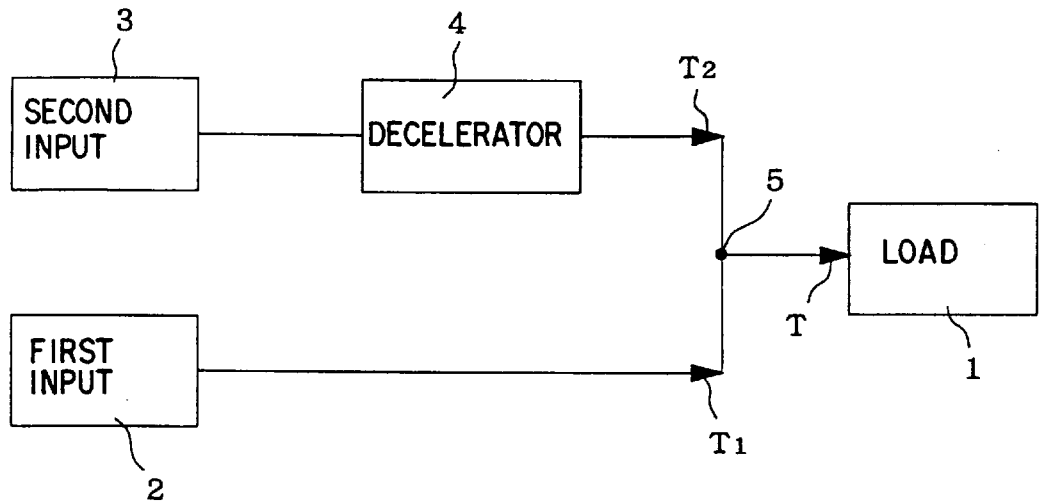
FIG. 1 is a block diagram which shows the normal operating state of a driving unit with auxiliary power mechanism.
Figure 2:
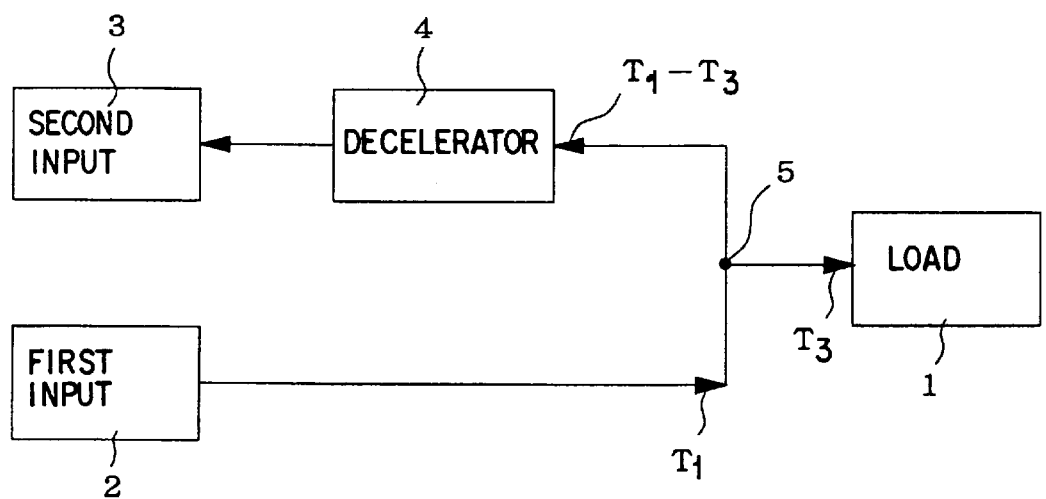
FIG. 2 is a block diagram which shows the operating state of a driving unit with auxiliary power mechanism when the driving speed of the first input unit is faster than that of the load.
Figure 3:
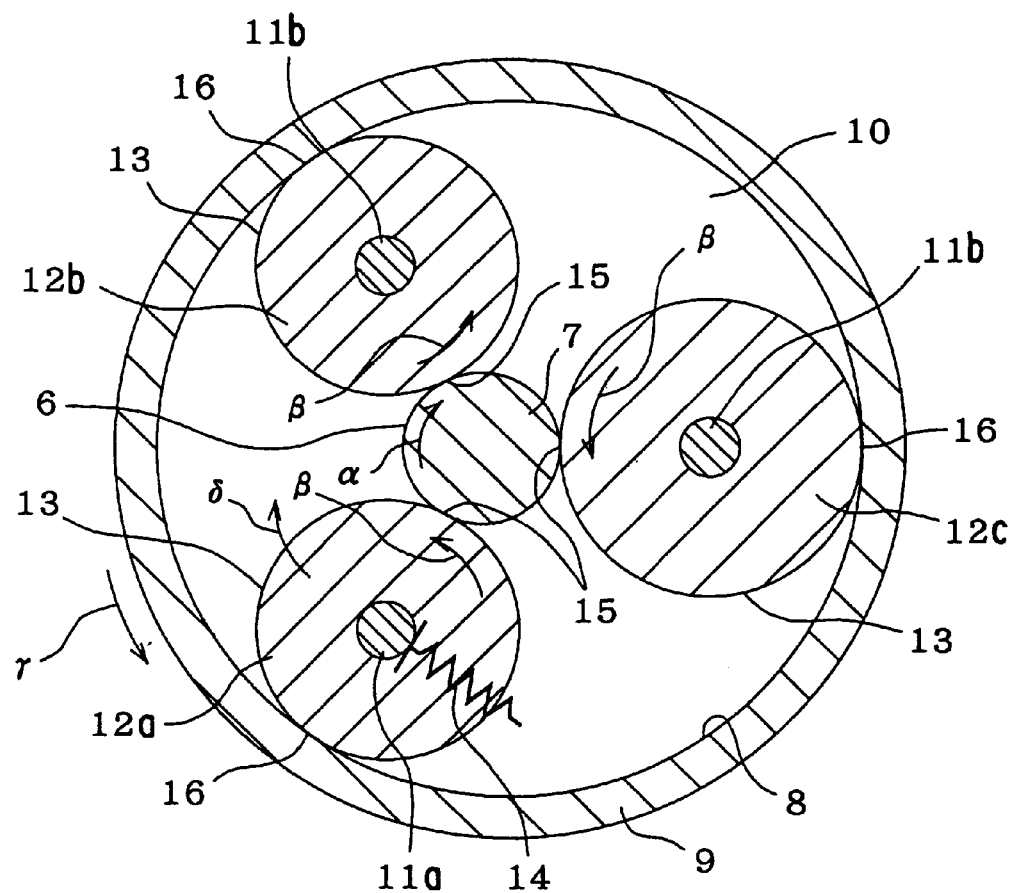
FIG. 3 is similar to FIG. 6 and shows a first example of a conventional friction-roller speed changer.

In the friction-roller speed changer of this invention, similar to the examples of the prior art friction-roller speed changer shown in FIGS. 3, 4, the center of the center roller 7 is eccentric with reference to the centers of the output shaft 131 and outer ring 9. In other words, as described above, the through hole 23, through which the center roller 7 is inserted, is located almost at the center of the housing 18, and the second through hole 132, through which the output shaft 131 passes, is a little separated from the center of the housing 18. Accordingly, the thickness of the peripheral wall of housing 18 is uneven in the circumferential direction. Furthermore, the output shaft 131 that is supported on the inside of the second through hole 132 is concentric with the outer ring 9. Therefore, the center roller 7 is eccentric with reference to the outer ring 9 and output shaft 131 by the amount "$\epsilon$" (FIGS. 13, 16) that the through hole 132 is separated from the center of the housing 18. Also, the dimension of the width of the annular space 10 between the outer peripheral surface of the center roller 7 and the inner peripheral surface of the outer ring 9, where the intermediate rollers 12a, 12b, 12c are located, is unequal in the circumferential direction by the amount corresponding to this eccentricity " $\epsilon$".

Therefore, the intermediate rollers 12a, 12b, 12c have different outer diameters by the amount that the width size of the annular space 10 is unequal in the circumferential direction. In other words, the two intermediate rollers 12a, 12b, which are located on the side where the center roller 7 is eccentric with respect to the outer ring 9 (lower side in FIGS. 14, 16), have the same relatively small diameter.

On the other hand, the intermediate roller 12c, which is located on the opposite side from the center roller 7 which is eccentric with respect to the outer ring 9 (upper side in FIGS. 13, 14, 16), has a larger diameter than the diameters of the two intermediate rollers 12a, 12b.

Moreover, the third cylindrical surfaces 13 which are formed around the outer peripheral surfaces of these three intermediate rollers 12a, 12b, 12c, come in contact with the first cylindrical surface 6 formed around the outer peripheral surface of the center roller 7, and with the second cylindrical surface 8 formed around the inner peripheral surface of the outer ring 9. The speed change ratio of the friction-roller speed changer 17 is determined from the ratio of tie diameter of the first cylindrical surface 6 and diameter of the second cylindrical surface 8. Therefore, in order to obtain the required speed reduction ratio, it is possible to fit a sleeve around the tip end portion of the center roller 7 and to bring the outer peripheral surface of the sleeve in contact with the outer peripheral surfaces of the intermediate rollers 12a, 12b, 12c. In this case, the first cylindrical surface is formed by the outer peripheral surface of the sleeve.

Figure 17:
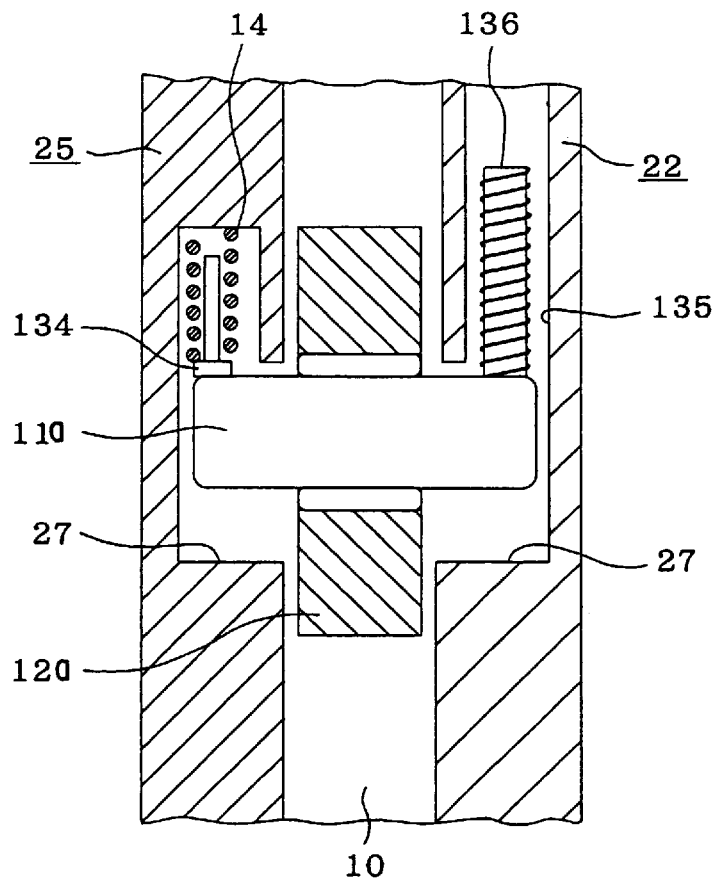
FIG. 17 is an enlarged cross-sectional view taken along the line XVII—XVII of FIG. 14.
Figure 18:
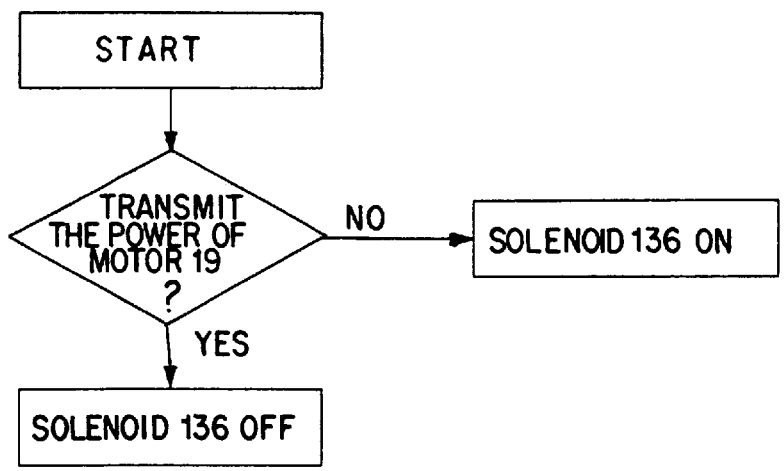
FIG. 18 is a flow chart to show a control state of the solenoid when using the example of FIG. 13.

Moreover, the intermediate roller 12a rotatable supported around the shaft 11a acts as wedge rollers. Accordingly, there is a pressure means or springs 14 provided between the shaft 11a with the intermediate roller 12a and the connection plate 25 as shown in FIGS. 14, 16, 17. The spring 14 that is a compression spring, elastically press or bias the wedge roller 12a toward tile narrow width area of the annular space 10 through the pressing piece 134 and the shaft. 11a.

In the friction-roller speed changer 17 of this invention, the shaft 11a for supporting the wedge roller or intermediate roller 12a is made of a magnetic material such as steel. And, the cover 22 has a portion formed with a support hole 135 which is opened on the inner peripheral surface of the support hole 27 on the side of the wider width area of the annular space 10. Supported in the support hole 135 is a solenoid 136 the tip end face of which (left lower end face of FIG. 15) faces the outer peripheral surface at the end of the shaft 11a. When the solenoid 136 is turned on, the magnetic attractive force of the larger than the elastic force of the spring 14 is exerted between the solenoid 136 and the shaft 11a.

Thus, the spring 14 set in the connection plate 25 is aligned with the solenoid 136 set in the cover 22, so that the displacement direction of the intermediate roller 12a supported by the shaft 11a can be freely selected. Specifically, when the solenoid 136 is not turned on, the shaft 11a and intermediate roller 12a are elastically biased by the elastic force of the spring 14 toward the narrower area of the annular space 10, while when the solenoid 136 is turned on, the shaft 11a and intermediate roller 12a are biased toward the wider area of the annular space 10.

By transmitting rotational force by the friction roller speed changer constructed as mentioned above, the contact pressure can be secured between the first cylindrical surface 6 around the center roller 7 and the third cylindrical surfaces 13 around the wedge or intermediate roller 12a and around the two guide or intermediate rollers 12b, 12c and between the second cylindrical surface 8 inside the outer ring 9 and the third cylindrical surfaces 13 around the wedge or intermediate roller 12a and around the two guide or intermediate rollers 12b, 12c. The rotational drive force can be efficiently transmitted from the center roller 7 to the outer ring 9 through the three intermediate rollers 12a, 12b, 12c. This transmitting operation of the rotational drive force is similar to, that of the example of FIG. 3.

Upon transmitting the rotational drive force applied through the center roller 7, normally on the input side, to the friction-roller speed changer 17 of this invention, the wedge or intermediate roller 12a is elastically pressed toward the narrower areas of the annular space 10 only when tie rotational drive force is input from the center roller 7. For example, in the present embodiment, the electric power to the solenoid 136 is controlled under the condition as shown in the flow chart of FIG. 18. First, in the case where the electric motor 19 is turned on, and the solenoid 136 is turned off when the rotational drive force produced by the electric motor 19 is transmitted from the center roller 7 to the outer ring 9 through the intermediate rollers 12a, 12b, 12c. As a result, the rotational drive force is efficiently transmitted from the center roller 7 to the outer ring 9, which is similar to the example of FIG. 3.

Figure 19:
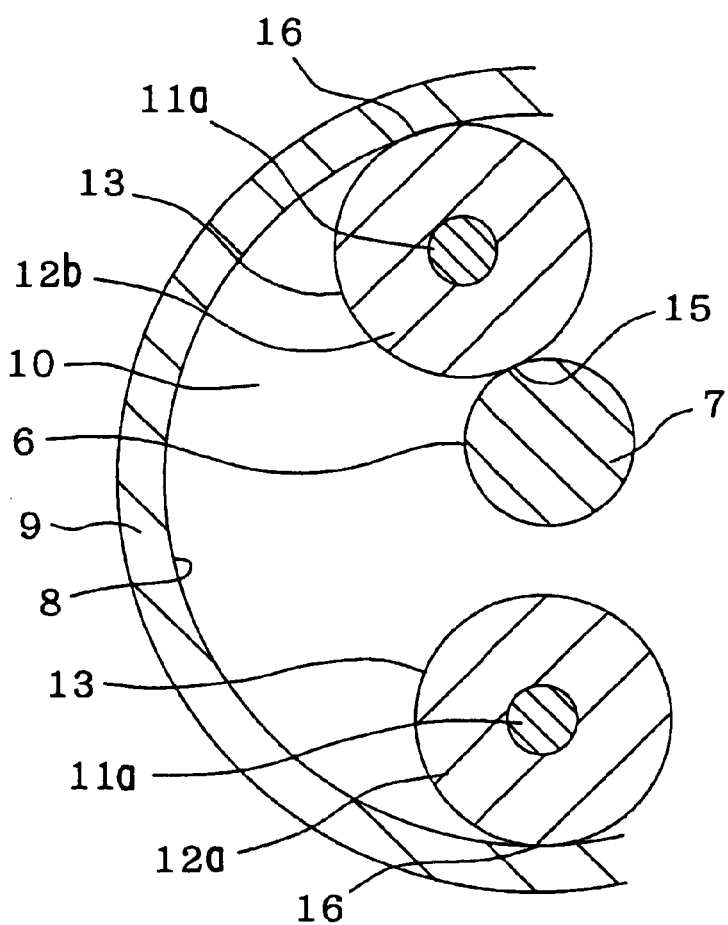

On the other hand, in the case where the electric motor 19 is not turned on, and there is no need of the rotational drive force taken out, the solenoid 136 is turned on, so that tie shaft 11a and the intermediate roller 12a are displaced toward the wider area of the annular space 10 as shown in FIG. 19. Consequently, the contact pressure is lost between the first cylindrical surface 6 around the center roller 7 and the third cylindrical surfaces 13 around the wedge or intermediate roller 12a and around the two guide or intermediate rollers 12b, 12c and between the second cylindrical surface 8 inside the outer ring 9 and the third cylindrical surfaces 13 around the wedge or intermediate roller 12a and around the two guide or intermediate rollers 12b, 12c. In this state, the rotational drive force is not transmitted to the center roller 7, and the existence of the electric motor 19 is not a resistance against the rotation of theouter ring 9. Accordingly, for example, the auxiliarily powered bicycle can be easily moved back.

Figure 20:
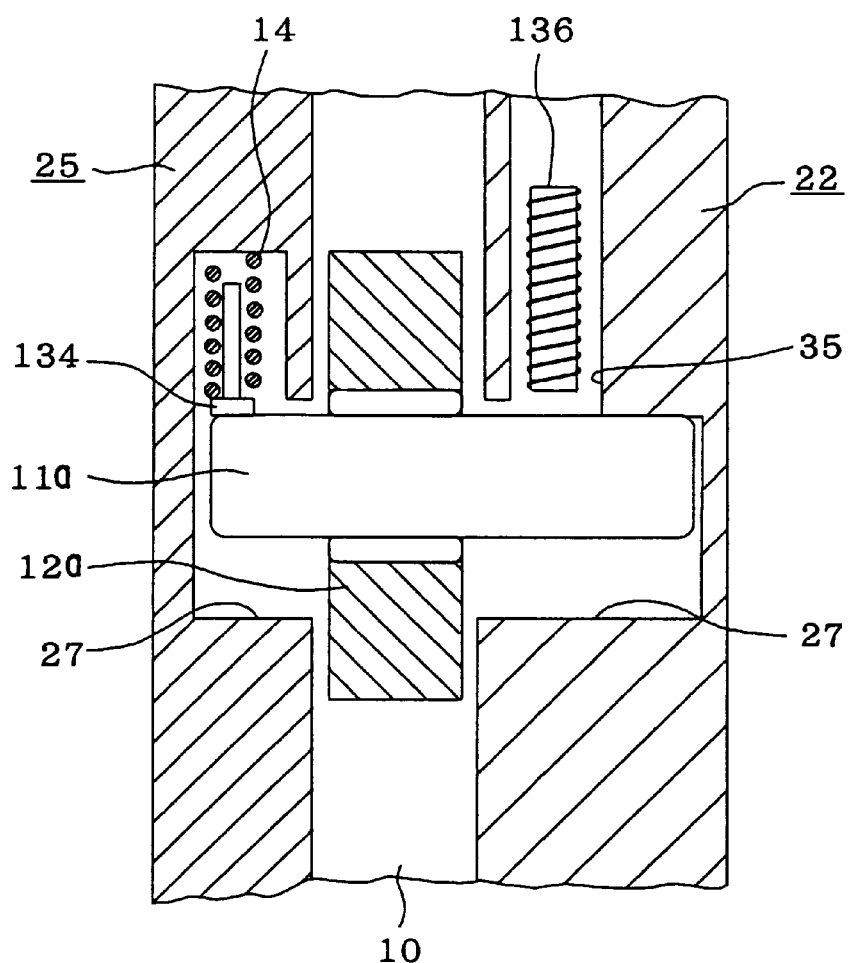
FIG. 20 is a cross-sectional view similar to FIG. 17 to show another example of the embodiments of the present invention.

FIG. 20 shows another example of the embodiments of this invention, where the tip end face of the solenoid 136 is separated from the outer peripheral surface of the shaft 11a of the magnetic material when the solenoid 136 is turned on, which is different from the example of FIG. 17. Specifically, in this example, when the solenoid 136 is turned on to attract the shaft 11a against the elastic force of the spring 14, the outer peripheral surface of the shaft 11a comes into contact with the inner peripheral surface of the support holes 27 before the tip end face of the solenoid 136 comes into contact with the outer peripheral surface of the shaft 11a. Accordingly, when the solenoid 136 is turned off, the tip end face of the solenoid 136 is easily separated from the outer peripheral surface of the shaft 11a, and the shaft 11a is hardly magnetized. The other elements of structure and operation are substantially the same as those of FIG. 17.

Figure 21:
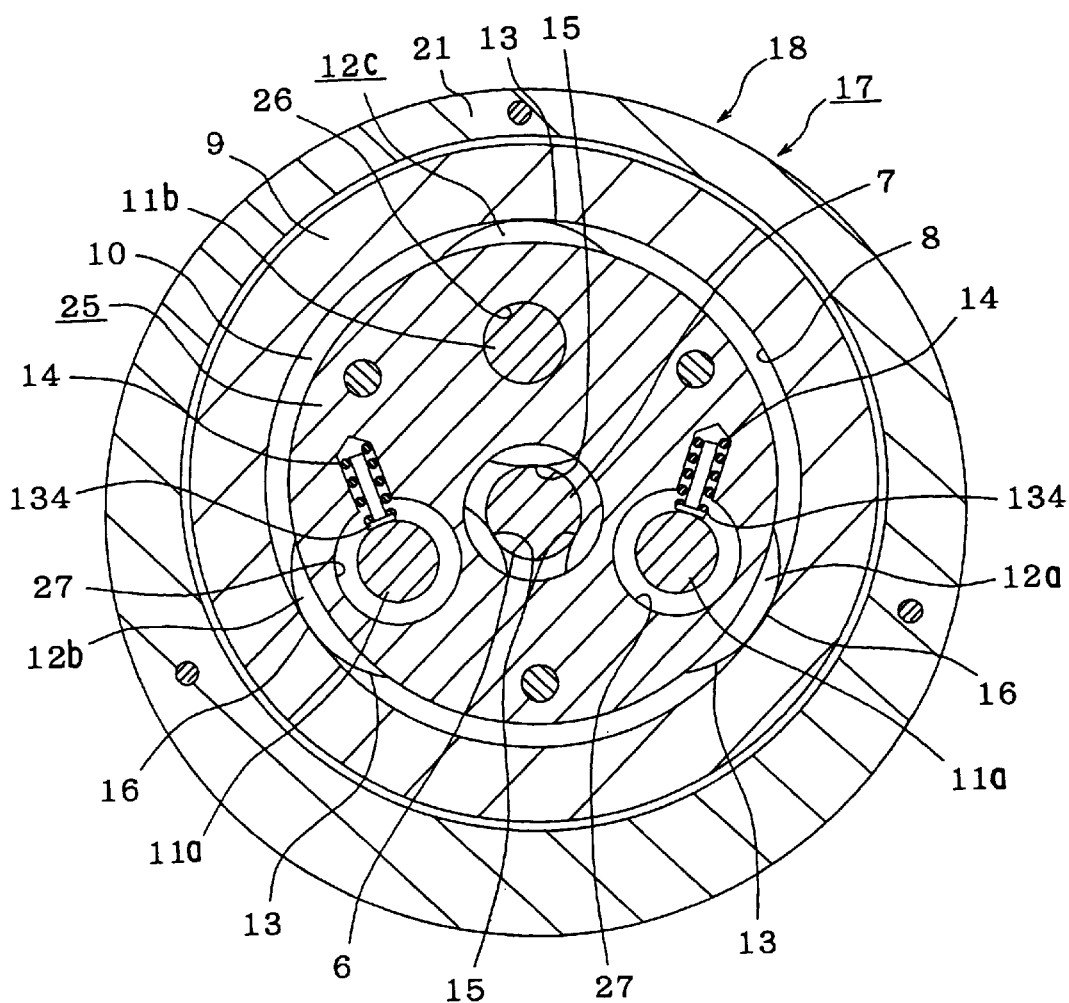
FIG. 21 is a cross-sectional vies similar to FIG. 14 to show another example of the embodiments of the present invention.
Figure 22:
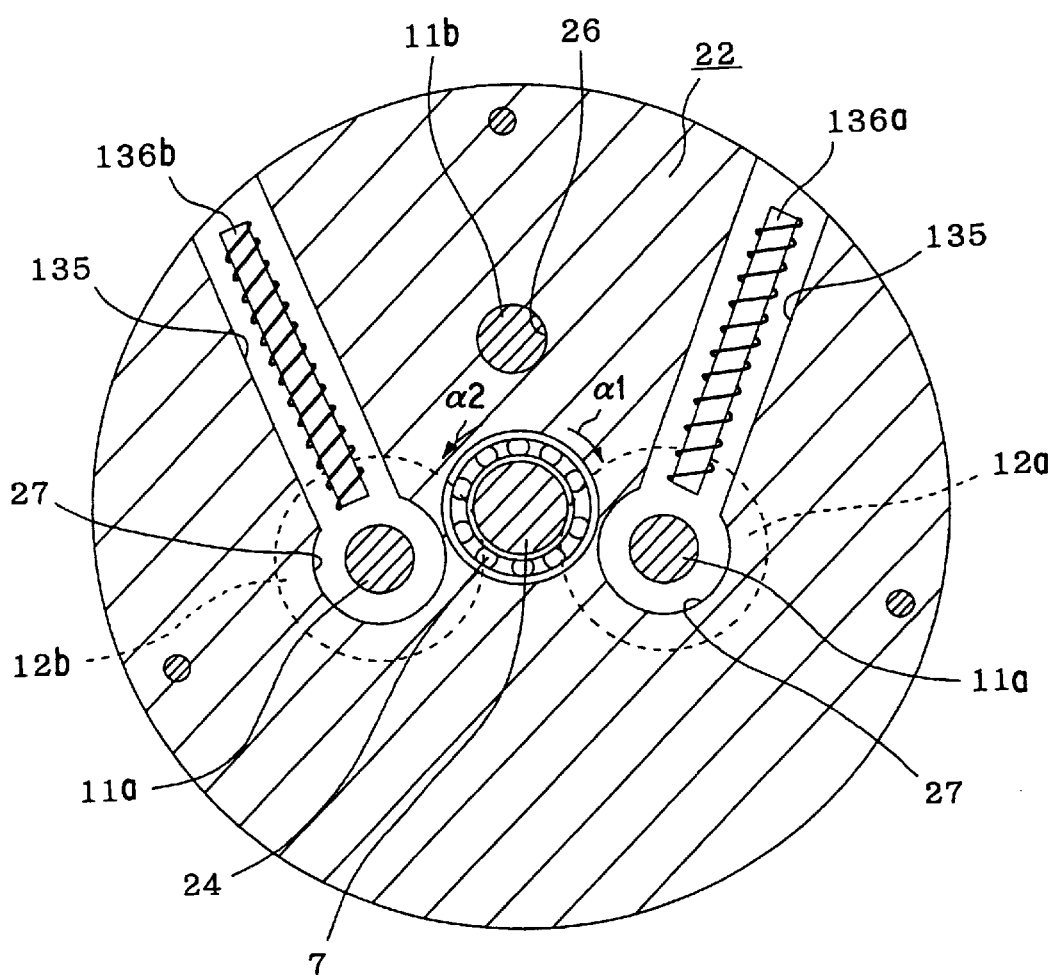
FIG. 22 is a cross-sectional view similar to FIG. 15.
Figure 23:
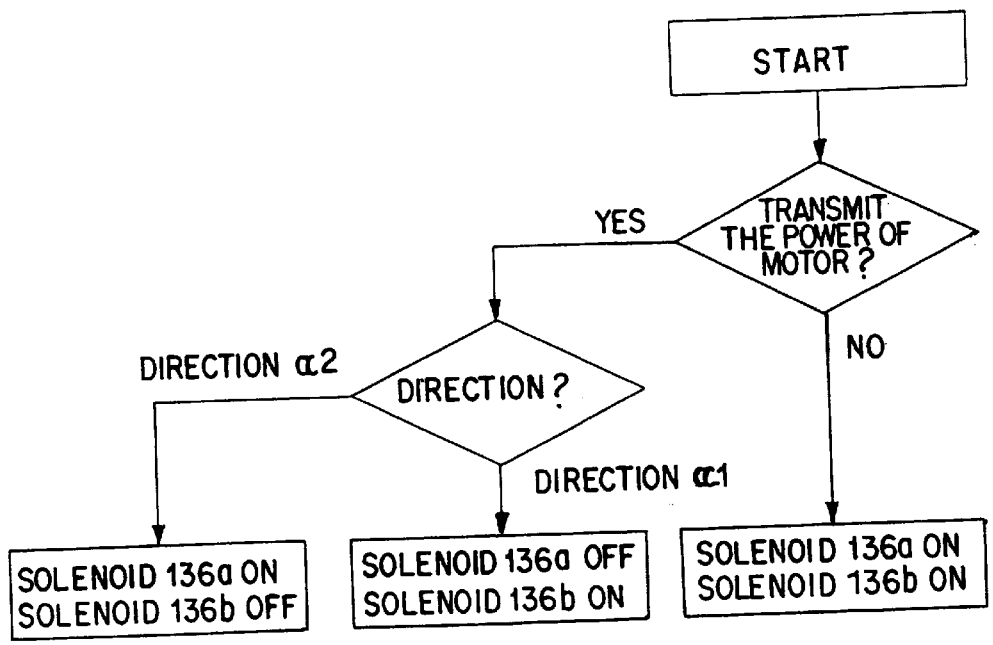
FIG. 23 is a flow chart to show a control state of the solenoid when using the construction of tie example of FIG. 21.

FIGS. 21 to 23 show another example of the embodiments of the present invention, where the present invention is applied to the conventional structure as shown in FIG. 4, specifically having two intermediate rollers 12a, 12b as wedge rollers for sufficient transmission efficiency in either rotational direction of drive force to be transmitted. Accordingly, the solenoids 136a, 136b are provided in alignment with the springs 14 to elastically press the shafts 11a with intermediate rollers 12a, 12b in circumferentially opposite directions. The solenoids 136a, 136b are set in a similar manner as in the example of FIGS. 13 and 19.

In the present embodiment, the electric power to the solenoid 136a, 136b is controlled under the condition as shown in the flow chart of FIG. 23. First, in the case where the electric motor 19 (FIG. 13) is turned on to rotate the center roller 7, and when the rotational drive force produced by the electric motor 19 is transmitted from the center roller 7 to the outer ring 9 either one of the solenoids 136a, 136b is turned on and the other turned off corresponding to the rotational direction (see $\alpha_1$ and $\alpha_2$ in FIG. 22). As a result, the rotational drive force is efficiently transmitted from the center roller 7 to the outer ring 9, which is similar to the example of FIG. 4.

On the other hand, in the case where the electric motor 19 is not turned on, and there is no need of the rotational drive force taken out, the solenoid 136a, 136b are turned on, so that the shafts 11a and the intermediate rollers 12a are displaced toward the wider area of the annular space 10, so that they are separated from each other. Consequently, the contact pressure is lost between the first cylindrical surface 6 around the center roller 7 and the third cylindrical surfaces 13 around the three intermediate rollers 12a, 12b, 12c and between the second cylindrical surface 8 inside the outer ring 9 and the third cylindrical surfaces 13 around the three intermediate rollers 12a, 12b, 12c. In this state, the rotational drive force of the outer ring 9 is not transmitted to the center roller 7, and the existence of the electric motor 119 is not a resistance against the rotation of the outer ring 9.

Figure 24:
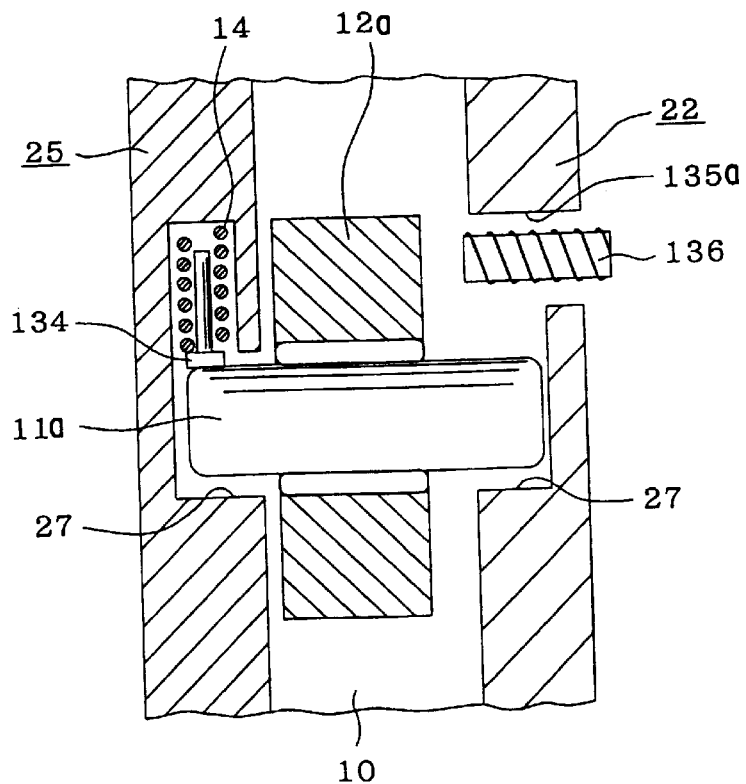
FIG. 24 is a cross-sectional view similar to FIG. 17 to show another example of the embodiments of the present invention.

FIG. 24 shows another example of the embodiments of the present invention, where the solenoid 136 to displace the shaft 11a against the elastic force of the spring 14 is provided in the support hole 135a which is formed through the cover 22 and in parallel with the center roller 7. By this construction, the power supply leads for the solenoid 136 are not taken out of the electric motor 19 with the friction-roller speed changer, which has the cover 22 provided adjacent the electric motor 19. In addition, in this structure of FIG. 24 where the stator of the motor 19 can be positioned closer to the solenoid 136, the wiring for power control to the stator and associated solenoid 136 can be simplified. The other elements of structure and operation are substantially the same as those of FIG. 13.

In the examples as mentioned above, as the solenoid is turned on, the intermediate rollers as wedge rollers are moved together with their shafts toward the wider area of the annular space 10. On the contrary, it is possible, as the solenoid is turned of to make the intermediate rollers as wedge rollers moved together with their shafts toward the wider area of the annular space 10 based on the elastic force of the spring which is weak comparing with the attractive force of the solenoid. In this case, the solenoid elastically presses the intermediate or wedge rollers toward the narrower area of the annular space 10.

In addition, it is possible to make the wedge or intermediate rollers of a magnetic material such as steel, so that the solenoid facing the outer peripheral surface of the center roller can be turned on so as to move the intermediate roller(s) toward the wider or narrower area of the annular space. In this construction, the both ends of the shaft supporting the intermediate roller can elastically pressed with a spring, so that the intermediate roller is elastically moved toward the narrow (or wide) area of the annular space. Accordingly, the balance of the forces between the shaft and the intermediate roller becomes good in the circumferential direction of the annular space.

Figure 25:
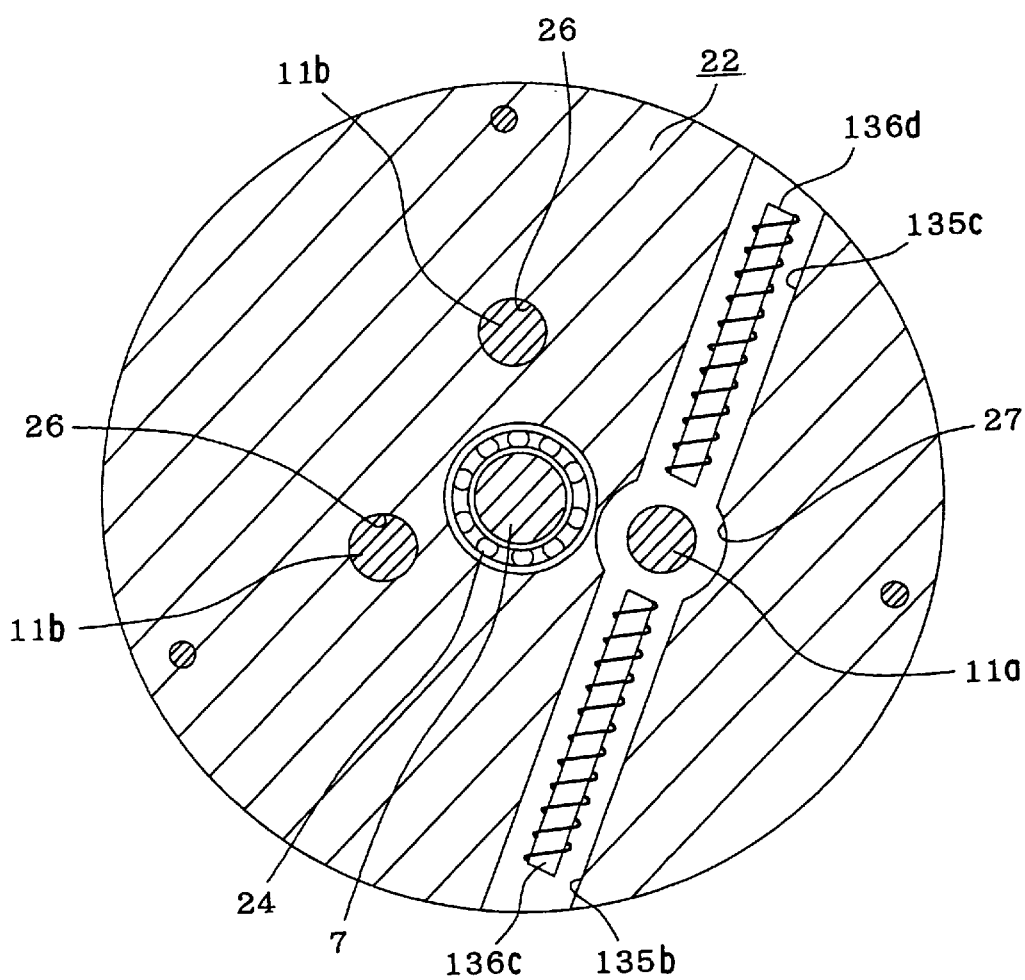
FIG. 25 is a cross-sectional view similar to FIG. 15 to slow another example of the embodiments of the present invention.

FIG. 25 show another example of the embodiments of the present invention, where a pair of support holes 135b, 135c extend in opposite directions with reference to the circumferential direction in the annular space, with the support hole 27 therebetween. The both ends of shaft 11a of the wedge roller or intermediate roller are loosely engaged with the support hole 27. The solenoids 136c, 136d are provided in the support holes 135b, 135c, respectively, so that the tip end face of the solenoids 136c, 136d faces the outer peripheral surface at the end of the shaft 11a. This example does not equipped with the spring to press the shaft 11a toward the narrower area of the annular space as in the previous examples.

In the present example having the pair of solenoids 136c, 136d, depending on whether the rotational force is transmitted between the center roller 7 and the outer ring, either one of the solenoids 136c, 136d is turned on, and the other turned off. Specifically, when transmitting the rotational force from the center roller 7 to the outer ring, the solenoid 136c (left lower one in FIG. 25) is turned on and the solenoid 136d (right upper one in FIG. 25) is turned off. As a result, the shaft 11a with the intermediate roller is displaced toward the narrower area of the annular space. In this state, the solenoid 136c functions as a pressure means to elastically press the wedge or intermediate roller toward the narrower area of the annular space, and the rotational drive force is transmitted efficiently from the center roller 7 to the outer ring as in the structure of FIG. 3.

On the other hand, when there is no need of transmitting the rotational drive force from the center roller 7 to the outer ring, the solenoid 136d is turned on and the solenoid 136c is turned off. As a result, the shaft 11a with the intermediate roller is displaced toward the wider area of the annular space. In this state, the rotational drive force is not transmitted to the center roller 7, and the existence of the electric motor connected to tie center roller 7 is not a resistance against the rotation of the outer ring.

The pair of solenoids provided for each of the shafts for supporting the intermediate or wedge roller can be applied to the structure of FIGS. 21 to 23 where two intermediate rollers are used as wedge rollers. In addition, the intermediate or wedge roller is made of a magnetic material such as steel, and the intermediate roller can be moved in a circumferential direction of the annular space, based on the power control to the pair of solenoids opposed to each other with respect to the outer peripheral surface of the center ring.

Figure 26:
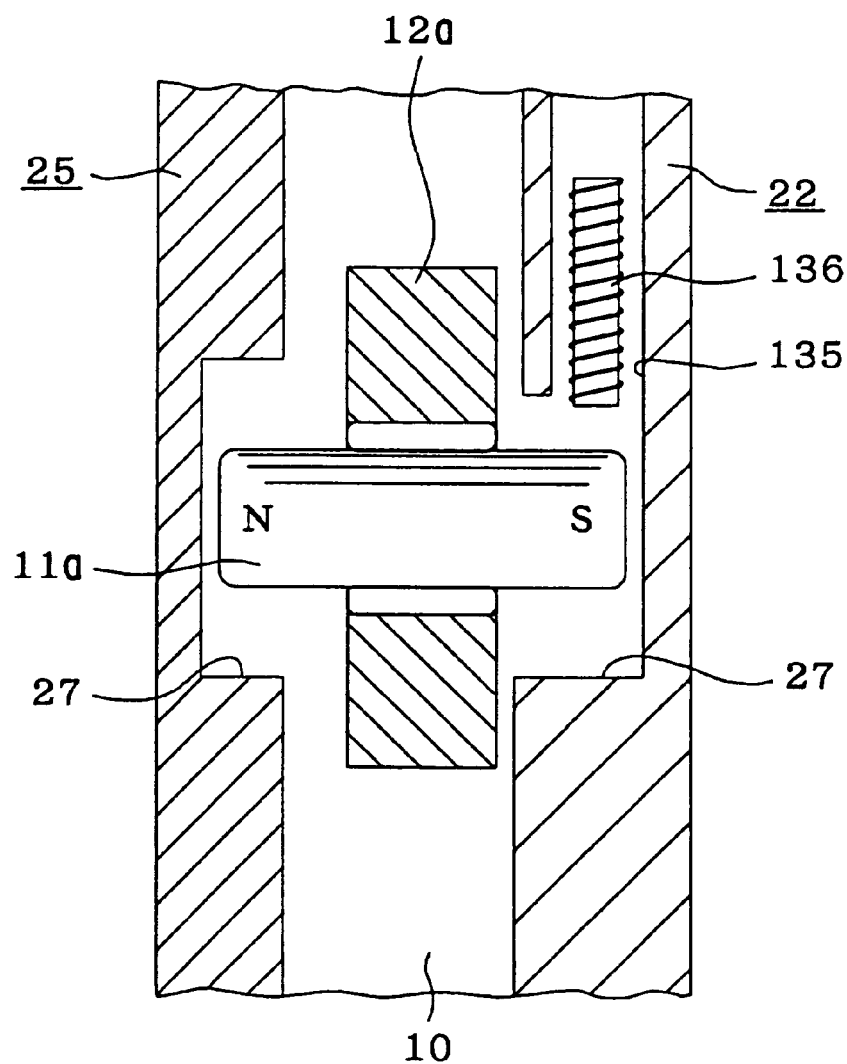
FIG. 26 is a cross-sectional view similar to FIG. 17 to show another example of the embodiments of the present invention.

FIG. 26 show another example of the embodiments of the present invention, where the shaft 11a for supporting the intermediate or wedge roller 12a is axially magnetized (left and right directions in FIG. 26), and the tip end face (lower end face in FIG. 26) of the solenoid 136 faces the outer peripheral surface of the shaft 11a at one end thereof (right end in FIG. 26). Based on the change in power supply directions to the solenoid 136, the tip end face of the solenoid 136 becomes either S-pole or N-pole. In this example, the spring to press the shaft 11a toward the narrower area of the annular space is not provided.

Incidentally, the solenoid 136 can be arbitrarily provided either in the narrower area or in the wider area of the annular space with reference to the shaft 11a, which is a design matter depending o installation space etc. The direction of the power supply, to the solenoid 136 depends on whether the rotational force is transmitted between the center roller and the outer ring or not, which in turn depends on the side where the solenoid 136 is provided.

With the present example, the power supply to the solenoid 136 is changed in direction and the magnetic polarity on the tip end face of die solenoid 136 is changed depending on whether the rotational force is transmitted between the center roller and the outer ring. The following explanation is made on the example of the solenoid 136 with S-pole on its end face provided in the wider area of the annular space 10 with reference to the shaft 11a.

When transmitting the rotational drive force from the center roller to the outer ring, the tip end face is magnetized in the S-pole. As a result, based on the magnetic repulsive force between the like poles, the shaft 11a with the intermediate roller 12a is displaced toward the narrower area of the annular space 10. In this state, the rotational drive force can be transmitted efficiently from the center roller to the outer ring as in the case of FIG. 4. The solenoid 136 functions as a pressure means to elastically press the wedge or intermediate roller 12a toward the narrower area of the annular space.

On the other hand, when there is no need of transmitting the rotational drive force from the center roller to the outer ring, the tip end face is magnetized in the N-pole. As a result, based on the magnetic attractive force between the unlike poles, the shaft 11a with the intermediate roller 12a is displaced toward the wider area of the annular space 10. In this state, the rotational drive force is not transmitted to the center roller.

In this example, the spring is omitted and only the single solenoid is provided to displace the shaft 11a with the intermediate roller in either circumferential direction of the annular space, which provides a compact and light-weighted structure.

When the solenoid is placed on the narrower area of the annular space, the direction of magnetization is reversed with respect to whether or not the transmission of rotational drive force is required, but the similar function and effects are obtained. Accordingly, the present invention provide a compact and light structure.

The present invention is described on the examples using three shafts each with an intermediate roller, but the friction roller speed change of the wedge roller type can be composed of a plurality of shafts each with an intermediate roller, specifically e.g. of two intermediate rollers or of four intermediate rollers. The two intermediate rollers, when adopted, are placed slightly on the narrower area side of the annular space, not on the diametrically opposite positions, with respect to the circumferential direction of the center roller. When two wedge rollers are adopted, three or more intermediate rollers are required.

What is claimed is:

1. A fiction-roller speed changer comprising:
   a first rotating shaft having an end portion,
   a center roller that is fixed to the end portion of said first rotating shaft in a concentric relationship with the first rotating shaft and formed with an outer peripheral surface to be a first cylindrical surface,
   an outer ring that has an inner peripheral surface to be a second cylindrical surface and is provided around said center roller to relatively rotate with respect to the center roller, the first and second cylindrical surfaces defining an annular space therebetween,
   a second rotating shaft which is provided in a concentric relationship with the outer ring and has one end connected to said outer ring,
   at least three shafts that are located in the annular space that is provided between said first cylindrical surface and said second cylindrical surface, and are arranged in parallel with said first rotating shaft,
   at least three intermediate rollers that are rotatably supported by said shafts, respectively, and each formed with an outer peripheral surface to be a third cylindrical surface,
      the center of said first rotating shaft being eccentric with reference to the centers of said second rotating shaft and outer ring, so that the width size of said annular space changes along the circumferential direction to provide narrower and wider areas it the annular space,
      two of said at least three intermediate rollers being supported such that they can move a little in the circumferential direction of said annular space to act as wedge rollers,
   a pressure means for pressing elastically these two intermediate rollers, which act as wedge rollers, in opposite directions from each other in the circumferential direction toward the narrower area of said annular space, and
   a selective pressure means for pressing one of said two intermediate rollers, which act as wedge rollers, toward the wider area of said annular space against the elastic pressure of said pressure means, by which the one of said two intermediate rollers can be pressed toward the wider area of said annular space.

2. A friction-roller speed changer comprising:
   a first rotating shaft having an end portion,
   a center roller that is fixed to the end portion of said first rotating shaft in a concentric relationship with the first rotating shaft and formed with an outer peripheral surface to be a first cylindrical surface,
   an outer ring that has an inner peripheral surface to be a second cylindrical surface and is provided around said center roller to relatively rotate with respect to the center roller, the first and second cylindrical surfaces defining an annular space therebetween,
   a second rotating shaft which is provided in a concentric relationship with the outer ring and has one end connected to said outer ring,
   a plurality of shafts that are located in the annular space that is provided between said first cylindrical surface and said second cylindrical surface, and are arranged in parallel with said first rotating shaft,
   a plurality of intermediate rollers that are rotatably supported by said shafts, respectively, and each formed with an outer peripheral surface to be a third cylindrical surface,
      the center of said first rotating shaft being eccentric with reference to the centers of said second rotating shaft and outer ring, so that the width size of said annular space changes along the circumferential direction to provide narrower and wider areas in the annular space,
      at least one of the intermediate rollers being supported so as to move a little in the circumferential direction of said annular space to act as a wedge roller,
   a pressure means for pressing elastically the intermediate roller, which acts as the wedge roller, toward the narrower area of said annular space, and
      the imediate roller acting as the wedge roller, or the shaft for supporting this intermediate roller being made of a magnetic material or permanent magnet, and
   a solenoid that is supported and fixed to face the intermediate roller or the shaft which is made of the magnetic material or the permanent magnet, and
      the solenoid being turned on or off to displace said intermediate roller which acts as the wedge roller, toward the wider area of said annular space.

3. A friction-roller speed changer comprising:
   a first rotating shaft having an end portion,
   a center roller fixed to the end portion of said first rotating shaft in a concentric relationship with the first rotating shaft and formed with an outer peripheral surface,
   an outer ring having an inner peripheral surface and provided around said center roller to relatively rotate with respect to the center roller, the outer peripheral surface of the center roller and the inner peripheral surface of the outer ring defining an annular space therebetween,
   a second rotating shaft provided in a concentric relationship with the outer ring and having one end connected to said outer ring,
   first, second and third shafts located in the annular space and arranged in parallel with said first rotating shaft,
   first, second and third intermediate rollers rotatably supported by said first, second and third shafts, respectively, and each formed with an outer peripheral surface,
      said first rotating shaft being eccentric with reference to said second rotating shaft and outer ring, so that the width size of said annular space changes along the circumferential direction to provide narrower and wider areas in the annular space, said first and second intermediate rollers being supported so as to be movable by a predetermined distance in the circumferential direction of said annular space to act as wedge rollers, a pressure means for pressing elastically the first and second intermediate rollers in opposite directions from each other in the circumferential direction toward the narrower area of said annular space, and a selective pressure means for pressing one of said first and second intermediate rollers toward the wider area of said annular space against the elastic pressure of said pressure means, by which the one of said first and second intermediate rollers can be pressed toward the wider area of said annular space.

4. A friction-roller speed changer comprising:

a first rotating shaft having an end portion, a center roller fixed to the end portion of said fist rotating shaft in a concentric relationship with the first rotating shaft and formed with an outer peripheral surface, an outer ring having an inner peripheral surface and provided around said center roller to relatively rotate with respect to the center roller, the outer peripheral surface of the center roller and the inner peripheral surface of the outer ring defining an annular space therebetween, a second rotating shaft provided in a concentric relationship with the outer ring and having one end connected to said outer ring, first and second shafts located in the annular space and arranged in parallel with said first rotating shaft, first and second intermediate rollers rotatably supported by said first and second shafts, respectively, and each formed with an outer peripheral surface, said first rotating shaft being eccentric with reference to said second rotating shaft and outer ring, so that the width size of said annular space changes along the circumferential direction to provide narrower and wider areas in the annular space, the first intermediate roller being supported so as to move by a predetermined distance in the circumferential direction of said annular space to act as a wedge roller, a pressure means for pressing elastically the first intermediate roller toward the narrower area of said annular space, and the first intermediate roller or the first shaft for supporting the first intermediate roller being made of a magnetic material or permament magnet, and a solenoid supported and fixed to face the first intermediate roller or the first shaft, and the solenoid being turned on or off to displace said first intermediate roller toward the wider area of said annular space.

* * * * *